US011323596B2

(12) United States Patent
Pritchett et al.

(10) Patent No.: US 11,323,596 B2
(45) Date of Patent: May 3, 2022

(54) VIDEO DOORBELL PROTECTION DEVICE AND METHODS FOR USING SAME

(71) Applicant: DOORBELL BOA OPERATING LLC, Peachtree Corners, GA (US)

(72) Inventors: James Pritchett, Johns Creek, GA (US); Douglas B. Ohlson, Johns Creek, GA (US)

(73) Assignee: Doorbell Boa Operating LLC, Peachtree Corners, GA (US)

( * ) Notice: Subject to any disclaimer, the term of this patent is extended or adjusted under 35 U.S.C. 154(b) by 0 days.

(21) Appl. No.: 17/371,072

(22) Filed: Jul. 8, 2021

(65) Prior Publication Data
US 2021/0337090 A1    Oct. 28, 2021

Related U.S. Application Data

(63) Continuation-in-part of application No. 16/664,799, filed on Oct. 26, 2019.

(Continued)

(51) Int. Cl.
*H04N 5/225* (2006.01)
*G03B 17/56* (2021.01)
*H04N 7/18* (2006.01)

(52) U.S. Cl.
CPC ......... *H04N 5/2252* (2013.01); *G03B 17/561* (2013.01); *H04N 5/225251* (2018.08); *H04N 7/186* (2013.01)

(58) Field of Classification Search
CPC ........... H04N 5/2252; H04N 5/225251; H04N 7/186; G03B 17/561

(Continued)

(56) References Cited

U.S. PATENT DOCUMENTS 3,270,333 A * 8/1966 La Barber .............. G08B 13/08
340/546
4,817,239 A * 4/1989 Campbell ............. E05B 1/0053
16/413

(Continued)

FOREIGN PATENT DOCUMENTS

WO    2021081538 A1    4/2021

OTHER PUBLICATIONS

International Search Report and Written Opinion dated Jan. 27, 2021 cited in Application No. PCT/US20/57428, 7 pgs.

(Continued)

*Primary Examiner* — Joseph G Ustaris
*Assistant Examiner* — Matthew David Kim
(74) *Attorney, Agent, or Firm* — Bekiares Eliezer LLP

(57) ABSTRACT

Disclosed herein are devices and systems for securely housing and mounting video doorbells. In one aspect, a disclosed device encompasses a housing for securely containing the video doorbell; and a bracket assembly configured to removably mount to a dimensional object, the bracket assembly including a first bracket portion configured to releasably attach to the housing, and a second bracket portion configured to detachably couple with the first bracket portion, the second bracket portion including a mounting plate, a back plate, at least one bracket member extending from a first edge of said mounting bracket to a first edge of said back plate, and at least one tongue extending from a second edge of said mounting plate. Also disclosed herein are kits and methods for using the disclosed devices and systems.

20 Claims, 26 Drawing Sheets

Related U.S. Application Data

(60) Provisional application No. 62/705,640, filed on Jul. 8, 2020.

(58) Field of Classification Search
    USPC .......................................................... 348/143
    See application file for complete search history.

(56) References Cited

U.S. PATENT DOCUMENTS

| | | | |
|---|---|---|---|
| 4,894,858 | A | 1/1990 | Collingwood |
| 4,909,052 | A | 3/1990 | Hutwohl |
| 5,309,510 | A | 5/1994 | Berndt |
| 5,341,123 | A | 8/1994 | Schuman, Sr. et al. |
| 8,398,316 | B2 | 3/2013 | Mota et al. |
| 8,534,627 | B2 | 9/2013 | Kressin |
| 9,578,261 | B1 | 2/2017 | Rockwell et al. |
| 2009/0096918 | A1 | 4/2009 | Montelongo |
| 2011/0243545 | A1* | 10/2011 | Mota .................. G03B 17/00 396/427 |
| 2011/0292213 | A1 | 12/2011 | Lacey |
| 2012/0182382 | A1* | 7/2012 | Serramalera ........... H04N 7/147 348/14.07 |
| 2013/0293368 | A1 | 11/2013 | Ottah et al. |
| 2021/0314532 | A1 | 10/2021 | Pritchett |

OTHER PUBLICATIONS

U.S. Non-Final Office Action dated Aug. 30, 2021 cited in U.S. Appl. No. 16/664,799, 13 pgs.

* cited by examiner

VIDEO DOORBELL PROTECTION DEVICE AND METHODS FOR USING SAME

CROSS REFERENCE TO RELATED APPLICATIONS

This application is a Continuation-In-Part of U.S. patent application Ser. No. 16/664,799 filed on Oct. 26, 2019 and claims the benefit of priority to U.S. Patent Provisional Application No. 62/705,640 filed on Jul. 8, 2020, which are herein incorporated in their entireties.

FIELD OF INVENTION

The present invention relates to apparatuses, devices, systems, and methods for securely housing and mounting video doorbells, smart doorbells, and other related video communication equipment.

BACKGROUND OF THE INVENTION

Video doorbells are great tools for deterring crime and monitoring a home's exterior. Millions of video doorbells are being sold to consumers each year with sales increasing 28% annually. Sadly, non-property owners, such as apartment renters, dormitory residents, and travelers, have not or are unwilling to install such devices in their temporary residences due to resident restrictions and to avoid potential fines related to making permanent changes or damage to the property. With the rapid rise of video doorbell usage and the benefits they deliver, many residents in short-term or long-term rentals would nonetheless like to use video doorbells for the same reasons as property owners.

Accordingly, there remains a need for apparatuses and devices that allow an individual to securely house and removably mount video doorbells and related video transmitting equipment. Such a device would preferably be easy to mount and unmount and include anti-theft features to prevent theft of the mounted video doorbell. This need and other needs are satisfied by the various aspects of the present disclosure.

SUMMARY OF THE INVENTION

In accordance with the purposes of the invention, as embodied and broadly described herein, the invention, in one aspect, relates to apparatuses, devices, systems, and methods for securely housing and mounting video doorbells, smart doorbells, and related video transmitting equipment.

In another aspect, the invention relates to a device for securing mounting a video doorbell, the device comprising: a housing for securely containing the video doorbell; and a bracket assembly configured to removably mount to a dimensional object. In further aspects, the bracket assembly may comprise a first bracket portion configured to releasably attach to the housing, the first bracket portion including a mounting plate and at least one bracket member extending from a first edge of said mounting plate at a first end of said bracket member, the bracket member including a bracket ledge extending or formed from an opposed second end of said bracket member; and a second bracket portion configured to detachably couple with the first bracket portion, the second bracket portion including a mounting plate, a back plate, at least one bracket member extending from a first edge of said mounting bracket to a first edge of said back plate, and at least one tongue extending from a second edge of said mounting plate.

In another aspect, the invention relates to a device for securing mounting a video doorbell comprising a housing for securely containing the video doorbell and a bracket assembly configured to removably mount to a dimensional object. In further aspects, the bracket assembly may comprise a first bracket portion configured to releasably attach to the housing, the first bracket portion including a mounting plate, a bracket ledge and at least one bracket member extending from a first edge of said mounting plate to a first end of said bracket ledge, the bracket ledge including a hooked portion extending or formed from an opposed second end of said bracket ledge; and a second bracket portion configured to detachably couple with the first bracket portion, the second bracket portion including a mounting plate, a back plate, first and second bracket members both extending from a first edge of said mounting plate to a first edge of said back plate, the first and second bracket members defining an opening therebetween, and at least one tongue extending from an opposed second edge of said mounting plate.

In another aspect, the invention relates to a container for securing a video doorbell device. In still further aspects, the container may use a door hook which may comprise an anti-theft bracket door hook design with metal cylinder locking tubes. The tubes may be attached at the end of the bracket. Said bracket can then be used to secure the video doorbell to a door and help avoid damaging/altering the home property.

In another exemplary aspect, the invention relates to a method for securely housing and mounting a video doorbell using the disclosed devices. In further aspects, the invention also relates to additional methods for using the disclosed devices and systems, and kits comprising the disclosed devices.

To this end, various embodiments of the present invention may be referred to herein as a device, apparatus, system, bracket, door mount, secure container, protective video doorbell case, video doorbell protection apparatus, video doorbell protection system, and method for securely mounting a video doorbell, and may also be described or referred to as a product, apparatus, system, means, or device named the DOORBELL BOA™, or other such designation determined by the applicant. Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. Applicant retains and reserves all rights in its trademarks and copyrights included herein, and grants permission to reproduce the material only in connection with reproduction of the granted patent and for no other purpose. Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1A:
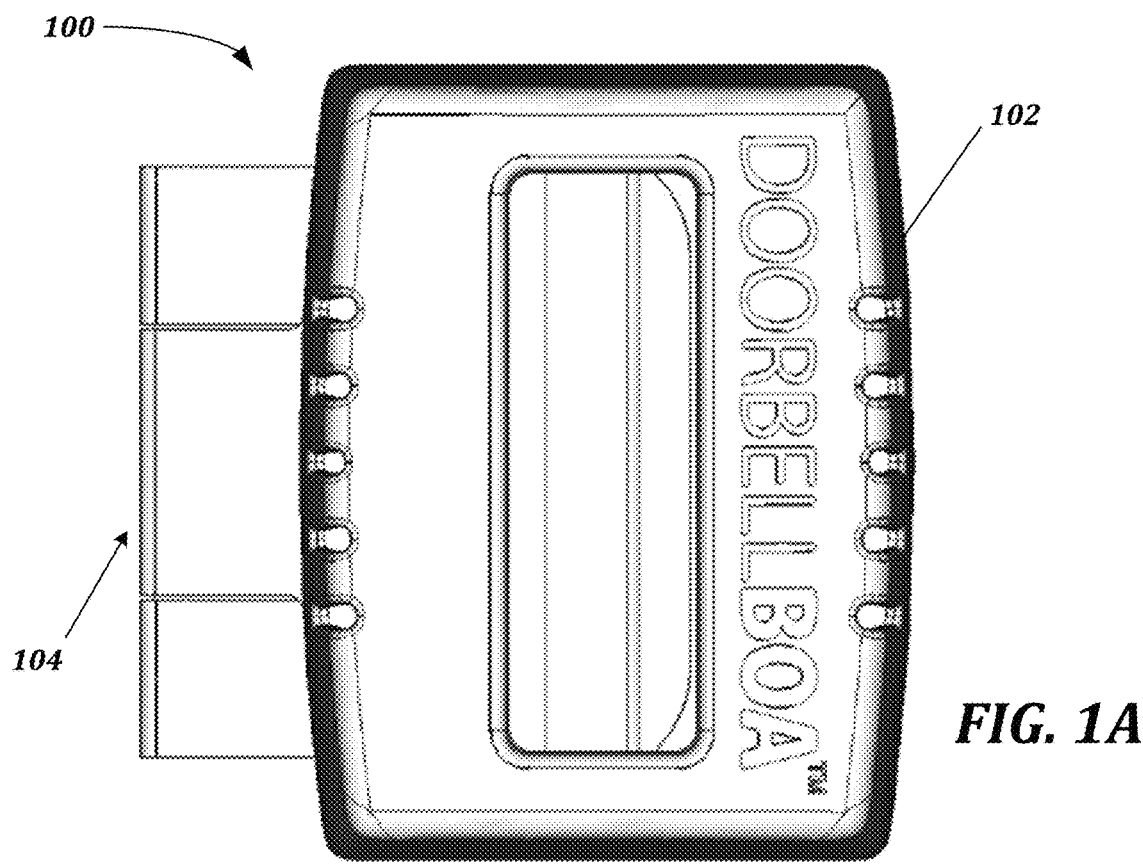
FIGS. 1A-1B show depictions of a device for securely mounting a video doorbell in accordance with an embodiment of the present disclosure.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification. All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a leg" includes two or more legs.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The invention of present disclosure may be referred to herein as a device, apparatus, system, bracket, door mount, secure container, protective video doorbell case, video doorbell protection apparatus, video doorbell protection system, and method for securely mounting a video doorbell, and may also be described or referred to as a product, apparatus, system, means, or device named the DOORBELLBOA™, DOORBELL BOA™, or other such designation determined by the applicant.

B. Device and System Overview

As briefly described above, the present disclosure provides, in various aspects, devices and systems for securely housing video doorbells and the like. In further aspects, the disclosed devices and systems may be useful for renters and temporary residents to safely and removably mount video doorbells without permanent damage to the residence. This brief summary is provided to introduce a selection of concepts in a simplified form that are further described below. This brief overview is not intended to identify key features or essential features of the claimed subject matter. Nor is this brief overview intended to be used to limit the claimed subject matter's scope.

In one aspect, the present disclosure provides a device comprising: a housing for securely containing the video doorbell; and a bracket assembly configured to removably mount to a dimensional object, the bracket assembly comprising: a first bracket portion configured to releasably attach to the housing, the first bracket portion including a mounting plate and at least one bracket member extending from a first edge of said mounting plate at a first end of said bracket member, the bracket member including a bracket ledge extending or formed from an opposed second end of said bracket member; and a second bracket portion configured to detachably couple with the first bracket portion, the second bracket portion including a mounting plate, a back plate, at least one bracket member extending from a first edge of said mounting bracket to a first edge of said back plate, and at least one tongue extending from a second edge of said mounting plate.

In another aspect, the invention provides a device comprising: a housing for securely containing the video doorbell; and a bracket assembly configured to removably mount to a dimensional object, the bracket assembly comprising: a first bracket portion configured to releasably attach to the housing, the first bracket portion including a mounting plate, a bracket ledge and at least one bracket member extending from a first edge of said mounting plate to a first end of said bracket ledge, the bracket ledge including a hooked portion extending or formed from an opposed second end of said bracket ledge; and a second bracket portion configured to detachably couple with the first bracket portion, the second bracket portion including a mounting plate, a back plate, first and second bracket members both extending from a first edge of said mounting plate to a first edge of said back plate, the first and second bracket members defining an opening therebetween, and at least one tongue extending from an opposed second edge of said mounting plate.

According to various aspects of the present disclosure, a device of the present invention comprises a housing, which may be shaped to conform to the contour of a flat surface, such as, for example, a surface of a door. In further aspects, the shaped housing may have an established shape, for example, by a preformed housing, or may be a moldable or foldable housing. In still further aspects, a housing may be flat in shape on at least its proximal side (i.e., side facing or contacting the door surface) so that the contact area is shaped so that all or substantially all of the proximal side or rear face of the housing contacts or is otherwise disposed on the adjacent surface. All or a portion of a housing may be flat. Additionally, in other embodiments, a proximal side and/or a distal side of the casing may be flat or planar, and the lateral sides of the casing may be shaped. In still further aspects, the lateral sides of the housing may be shaped in any form desired. The housing can be any shape, and preferably is in the shape of a three-dimensional polygon and the housing walls define an interior space or interior sections for containing the video doorbell and certain operating elements of the invention. Any other shape (as used herein, the term shape is used in the broad sense of three-dimensional works) may be employed, so long as the shape is large enough and structured so as to be able to contain the video doorbell and various working components of the invention as more fully disclosed below.

In further aspects, the housing is a generally hollow structure sized to contain the video doorbell and components disposed therein. In still further aspects, the housing is configured and dimensioned to allow most video doorbells to be securely installed therein. The housing can be a rigid hollow shell or open container having an interior volume. The housing may be constructed such that housing can contain and hold the video doorbell and components in a predetermined position relative to an opening on the housing for accessing the video doorbell. In further aspects, some or all of the device components can be housed within the housing such that they are protected from, for example, the environmental elements, such as water intrusion. In even further aspects, the housing can be comprised of plastic, plastic composite, reinforced plastic, metal, metal composite, or combinations thereof. In still further aspects, the plastic can comprise polypropylene, impact resistant plastic, or the like. In some aspects, the housing may comprise a plastic housing. In other aspects, the housing may comprise a metal housing. The housing may be a planar plate that is molded or folded into an open container allowing for ease of inserting and removing a video doorbell.

In further aspects, the housing may comprise at least one stabilizing or securing component for securely positioning the video doorbell within the housing. The stabilizing or securing component can comprise removable foam material or a clip, cam gripping element, locking mechanism, or other mechanical component for keeping the video doorbell in a fixed position within the housing. In further aspects, the stabilizing or securing component may be positioned within the housing such that when a video doorbell is inserted into the housing in a first direction, the stabilizing or securing component securely grips the video doorbell. In some aspects, the housing may comprise internal spaces or grooves for receiving foam spacers of various sizes. To this end, the user may select the appropriate foam spacer size(s) to match the video doorbell model to securely maintain the video doorbell position within the housing.

In further aspects, the housing may further comprise one or more openings and/or slots through the housing for providing sound from the video doorbell. In still further aspects, the housing may comprise an input port, such as a USB port, on the housing for interfacing with video doorbell for transmit power to the video doorbell and/or exchanging data with the video doorbell. In some embodiments, the input port can be a double-sided female input port, where a female port is disposed on the outer and inner surfaces of the housing wall that is connected to video doorbell on the inside using a standard male-male cable, such as a standard USB charging/data cable. In other embodiments, the input port can be a female input port disposed on the outer surface of the housing wall and a cable extending from the inner surface that can be connected to video doorbell on the inside. In such embodiments, the video doorbell can be charged or interfaced with using the external port on the outside of the housing without having to remove the video doorbell from the housing. In further aspects, device or housing may be connected to a power source to continuously recharge or power the video doorbell, such as, for example, and internal and/or external power source. The power source may be contained within the housing or may external or remotely located to the housing. The power source may comprise a battery, solar panel, electrical power supply, or the like. In some embodiments, the opening may be securely covered by a removable locking mechanism. To this end, the locking mechanism can provide access into the container when installed. Accordingly, the housing can serve as a lock box, wherein a lockable opening cover or lockable compartment may be installed in or on the housing.

In further aspects, the housing comprises at least one fastener post for receiving a fastener, or connecting or attachment means. In still further aspects, the housing can comprise a plurality of fastener posts for receiving fasteners and/or a connecting means or attachment means. In yet further aspects, the housing can comprise at least one fastener post for receiving a fastener, or connecting or attachment means for connecting to a portion of a bracket assembly. In even further aspects, the housing can comprise at least one fastener post for receiving a fastener, or connecting or attachment means for connecting to a plate, such as a mounting plate, or other similar component.

In further aspects, the housing and/or bracket assembly may further comprise a stabilizing area comprising an anti-slip material, for example, hook and loop fastener, on a portion or substantially all of designated surfaces of the housing and/or bracket assembly, such as those that may contact a mounting surface. In still further aspects, a stabilizing area may be found on the proximal (or rear side) of the housing and may cover a portion or substantially all of an area on the proximal side that corresponds to the surface adjacent to the mounting surface. In yet further aspects, housing may further comprise a non-abrasive material on a portion or substantially all of the distal (i.e., top) and lateral (i.e., side) sides of the housing. In further aspects, the bracket assembly can remain in place once positioned on the door, and can be easily unmounted. Further, tools are not required to mount or move the bracket or secure the bracket to a surface or door.

In various aspects, embodiments of the present invention may include at least one bracket assembly. In further aspects, a bracket assembly may be a multi-piece bracket. For example, in some aspects, the bracket assembly may be a two-part bracket comprising a first bracket portion and a second bracket portion. In still further aspects, at least one bracket or bracket portion may be configured to releasably attach to the housing. In even further aspects, one bracket or bracket portion may be configured to detachably couple with another bracket or bracket portion, for example, a first and second bracket or bracket portions may be configured to detachably couple to form the bracket assembly. In yet further aspects, some embodiments of a bracket or bracket portion may comprise a mounting plate and at least one bracket member. In other embodiments, a bracket or bracket portion may comprise one more of: a mounting plate, a back plate, at least one tongue extending from an edge of the mounting plate, and at least one bracket member extending from an edge of the mounting plate. In further aspects, a bracket portion may comprise a plurality of bracket members, for example, first and second bracket members extending between the mounting plate and back plate. In even further aspects, an opening may be formed between the plurality of bracket members, for example, between first and second bracket members. In some aspects, a bracket member can comprise an L-shaped member. In other aspects, a bracket member may comprise a U-shaped member. In further aspects, the bracket member may be a flat, planar member or a tubular member.

In further aspects, a bracket member may extend from an edge of the mounting plate, for example, a first edge of the mounting plate and at a first end of the bracket member. In yet further aspect, a bracket member may include a bracket ledge extending or formed from an edge of the bracket member, for example, from an opposed second end of said bracket member. In even further aspects, the bracket ledge may include a hooked portion extending or formed from an opposed second end of the bracket ledge. As further described herein, the hooked portion may be an anti-theft hook configured to prevent theft when installed on a door.

In further aspects, a bracket member may extend from a first edge of a mounting plate to a first edge of a back plate. In still further aspects, a tongue may extend from an edge of a mounting plate. The tongue may be configured to couple with a mounting plate opening of another bracket or bracket portion, for example, in order to couple the bracket portions together. To this end, the tongue of one bracket portion may configured to frictionally engage a mounting plate of another bracket portion by extending through or within the opening of its mounting plate and securely engaging against a rear surface of its mounting plate.

In further aspects, the mounting plate may comprise one or more apertures or openings disposed within the outer edges. In still further aspects, mounting plate may also comprise one or more fastener apertures or openings. In yet further aspects, the apertures may comprise one or more bracing members disposed within the aperture.

In further aspects, various embodiments of the invention may be weatherproof or configured to limit introduction of external environmental elements into the housing. For example, the device may comprise a clear protective film covering the video doorbell opening to allow video recording and interaction with doorbell while providing protecting from the outside elements. In still further aspects, the side apertures of the housing may comprise a permeable barrier material which allows air, sound, vapor, and electrical signals to pass through, but prevents water and liquids from passing through. Furthermore, the bracket members may comprise moisture seals on bracket surfaces that are configured to engage door surfaces when installed. Thus, when installed, the bracket seals form a barrier and prevent entry of contaminants and environmental elements into the device. Furthermore, the seal may also serve to enhance grip of the door and/or provide a protective layer between the bracket surface and the door surface. In further aspects, the device may further comprise non-abrasive material, such as felt or the like, on various surfaces of the bracket that contact the door surface when sliding or mounting the device on a door.

In various aspects, the components of the disclosed devices and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the device and system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

In various aspects, the device component characteristics and configuration, such as, for example, size and dimensions, can be configured to adjust for an individual user's height and other factors to achieve optimal operating parameters. In further aspects, features of the device and components may be configured or utilized to set and/or control the characteristics. For example, at least one of the following may be configured: the type of material used for the bracket assembly and housing; the bracket member dimensions (e.g., height, width, thickness, surface-contacting area, etc.); the flexibility or tensile properties of the bracket assembly; and the force transmission characteristics of the bracket assembly against the door. In further aspects, the devices may include an impact-dampening component or material. In further aspects, the devices can utilize the mechanical properties and benefits of the impact-dampening component for securing the video doorbell with in the housing. In still further aspects, the impact-dampening component can comprise a spring or shock or other shock absorbing materials, such as, for example, gels, air, gas, hydraulic, foam, a combination thereof or the like. In further aspects, the spring or tension element may comprise a spring-assist mechanism, such as and without limitation, a compression spring, extension spring, constant force spring, retraction spring, power spring, elastic retractor, torsion spring, or a combination thereof.

According to various aspects of the disclosure, the devices and systems of the present invention provides a number of advantages over current options. The combination of inventive configurations, device construction and positioning allow the disclosed devices and systems to be more effective in securely mounting video doorbells. According to various embodiments, the present invention provides a secure, removable mount for the video doorbell which, among other features, does not require permanent changes to the home and allows the user to easily unmount the device for charging and/or to take with them when traveling or changing residences.

C. Device and System Configuration

According to various aspects of the invention, the devices and systems of the present disclosure can comprise multiple configurations. FIGS. 1A-16 illustrate non-limiting examples of embodiments of operating environments, mechanisms, and components for the disclosed devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in the claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

Figure 1B:
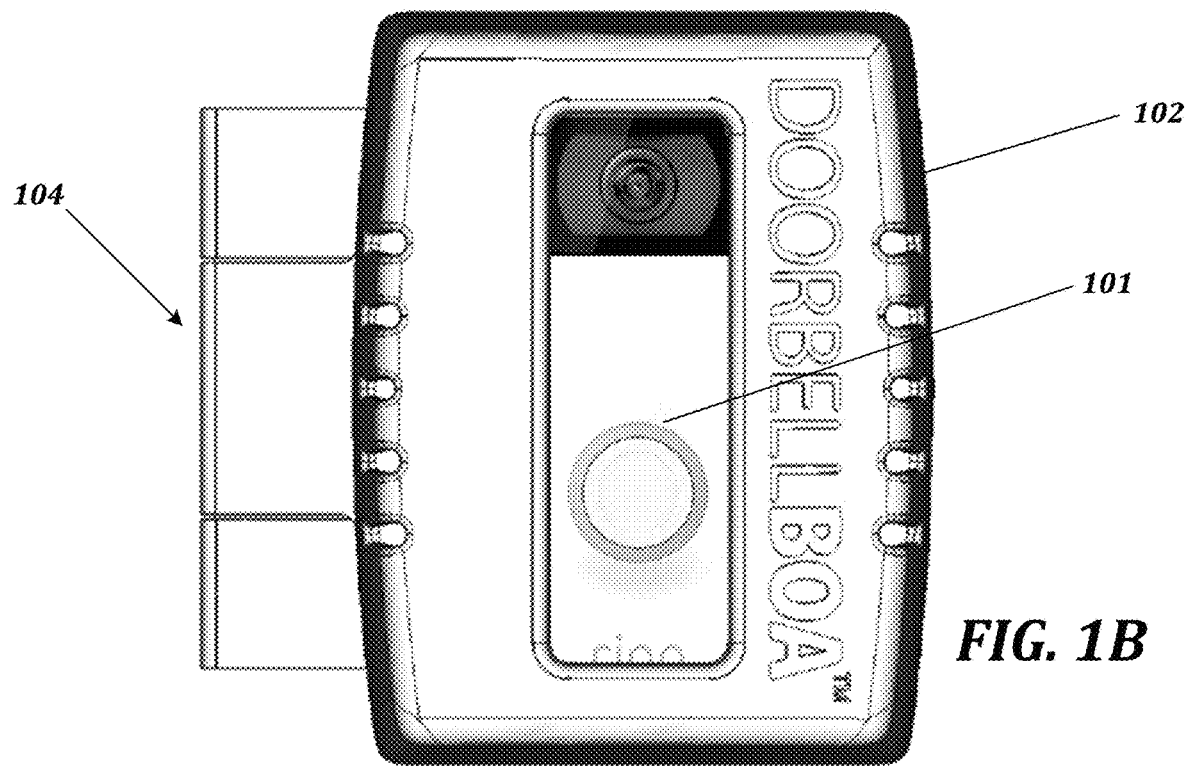

FIGS. 1A-1B show views an embodiment of a device 100 for securely housing a video doorbell 101 in accordance with the present invention. Device 100 generally includes housing 102 for securely containing the video doorbell coupled with bracket assembly 104 for mounting the device to an object, such as a door.

Figure 2A:
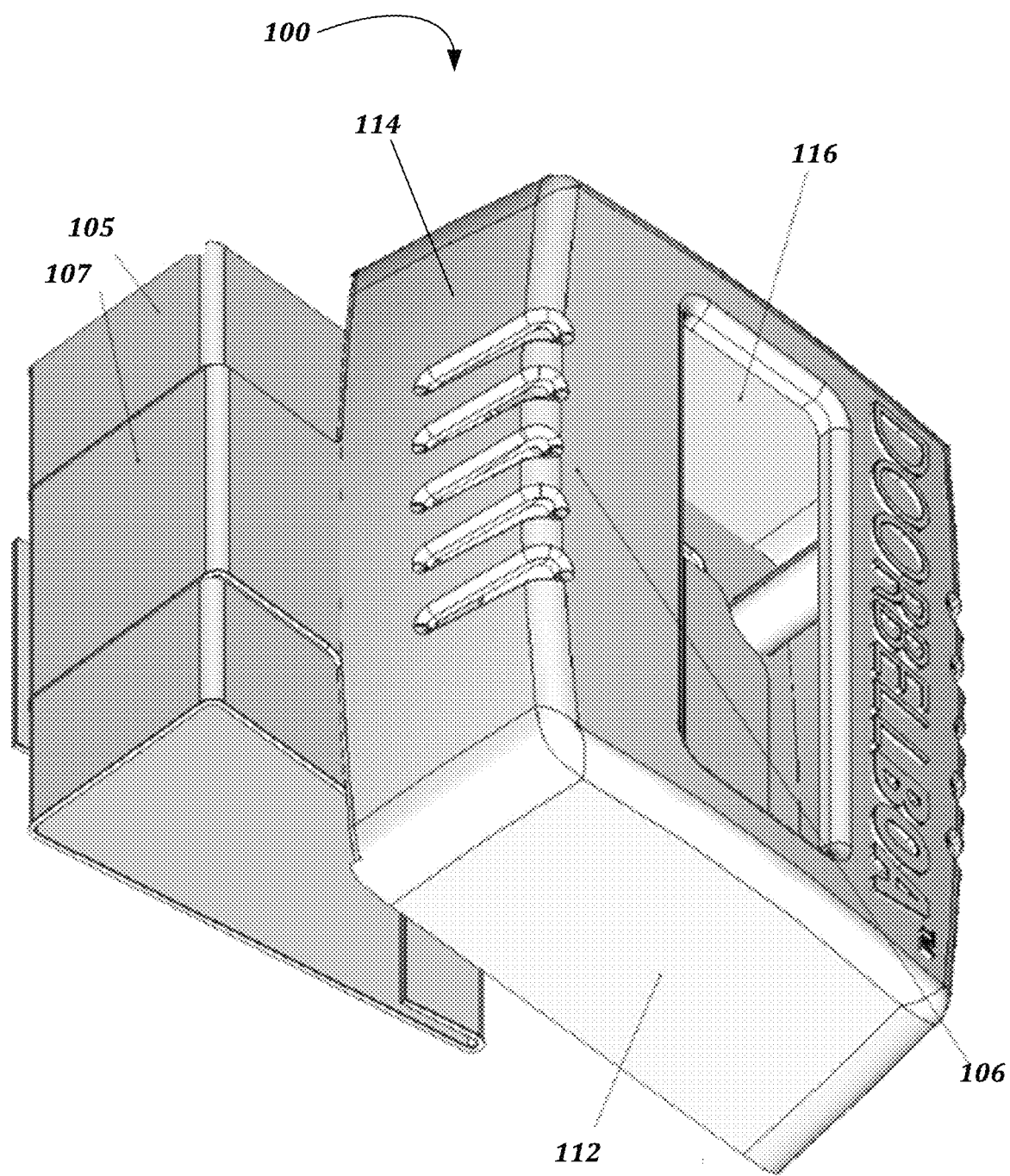
FIGS. 2A-2D shows a depiction of a device for securing mounting a video doorbell in accordance with an embodiment of the present disclosure.
Figure 2B:
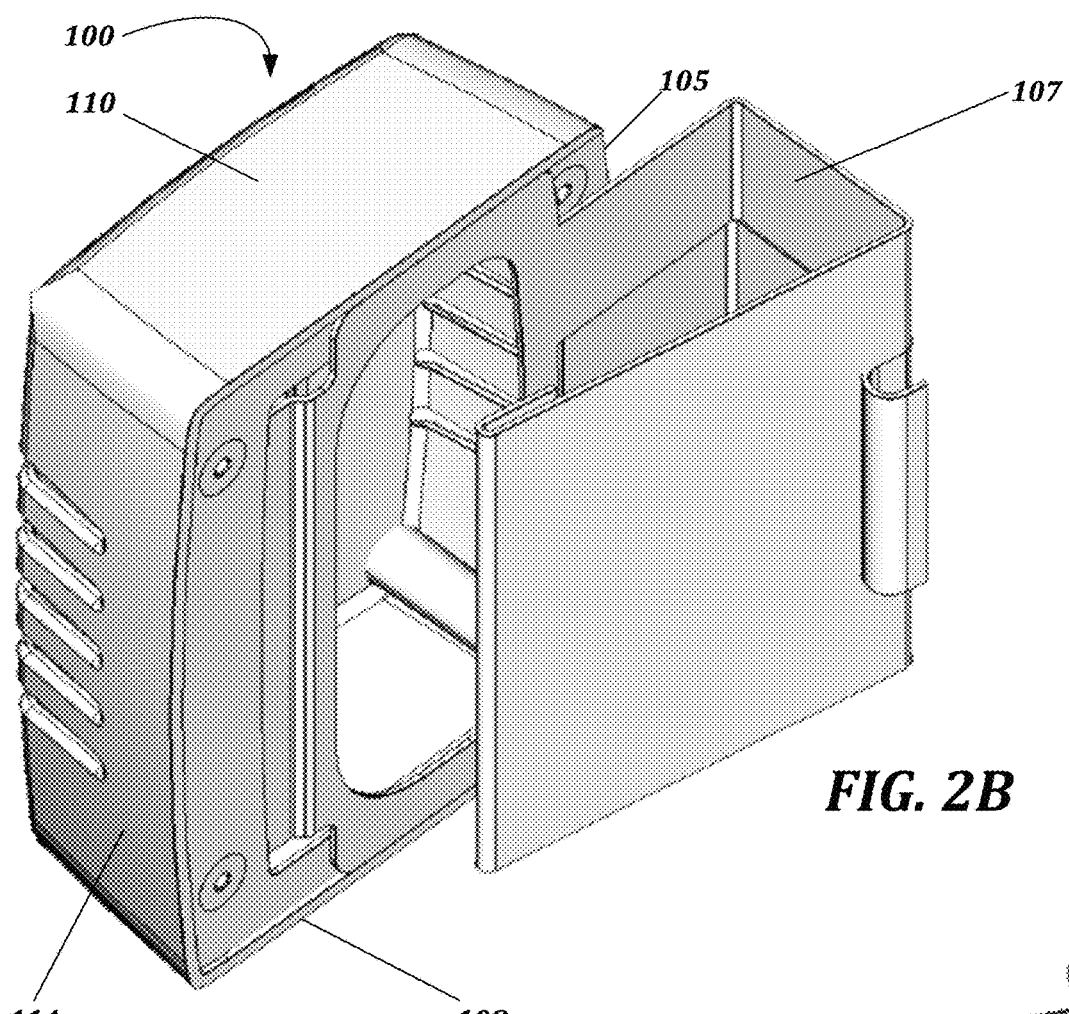
Figure 2C:
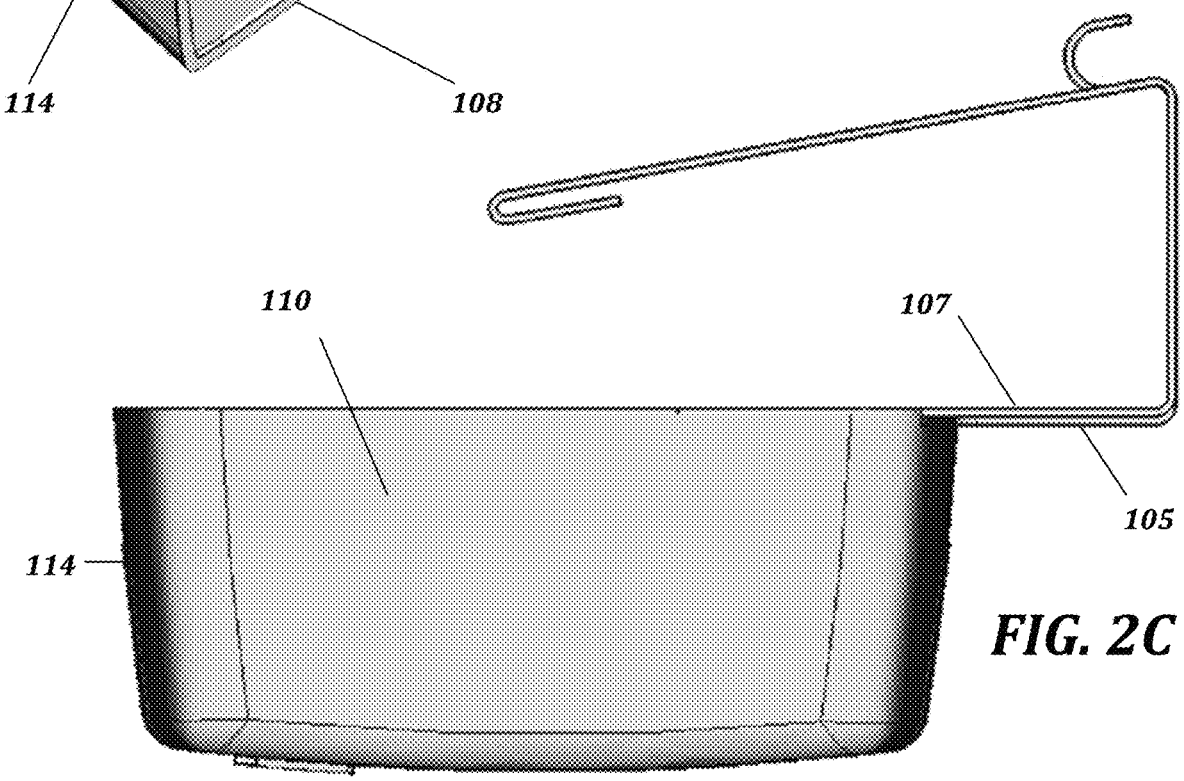
Figure 2D:
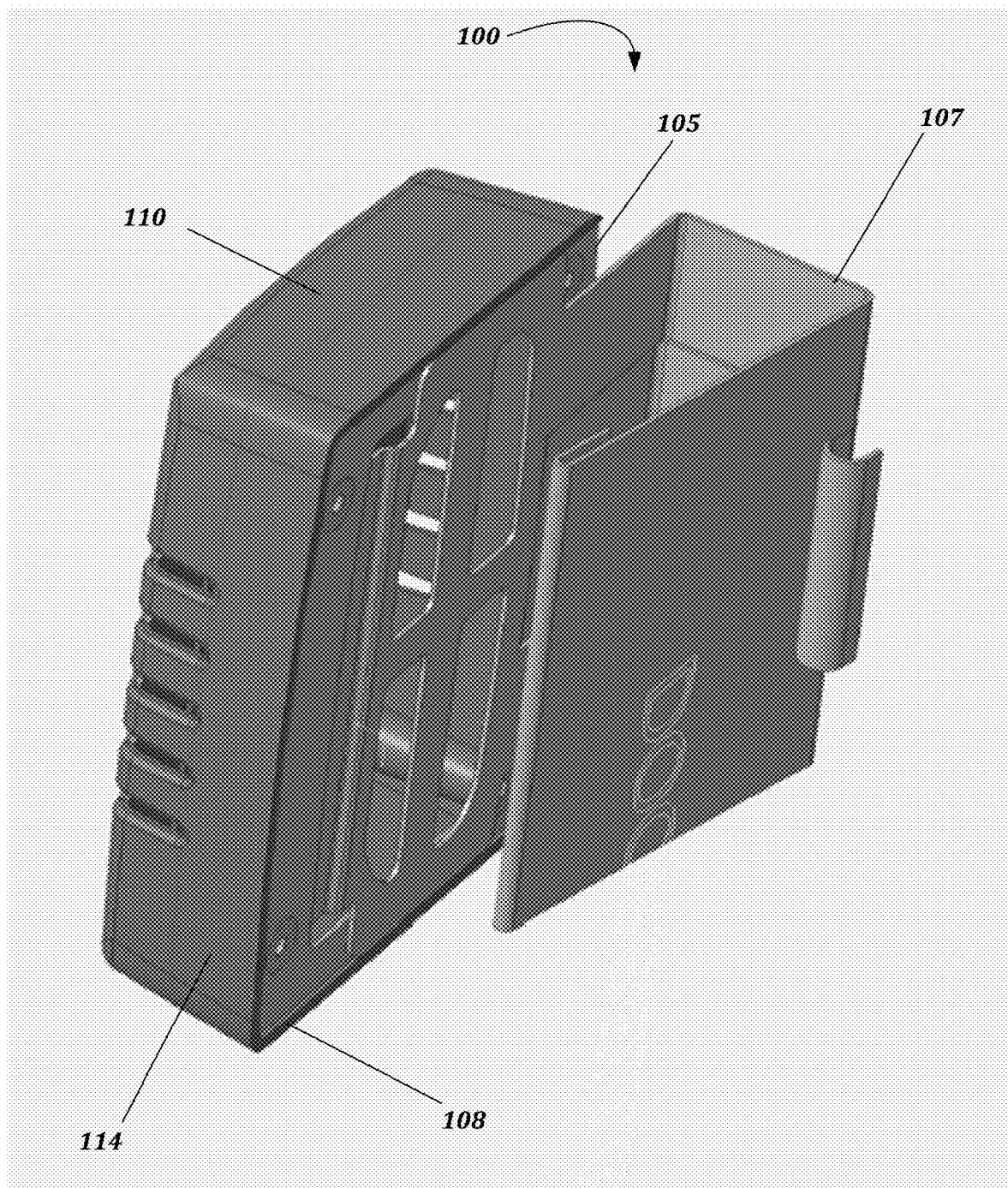

FIGS. 2A-2C are additional detailed views of device 100 showing various components and additional features. As shown, housing 102 may include an outward-facing front face 106, an inward-facing rear face 108, a top side 110, a bottom side 112, and opposed lateral sides 114. Front face 106 comprises an opening 116 configured and dimensioned to allow interaction and operation of a video doorbell contained therein. Bracket assembly 104 includes a first bracket portion 105 configured to releasably attach to rear face 108 of housing using fasteners 118, and second bracket portion 107 configured to detachably couple with first bracket portion 105. As is further detailed herein, first bracket portion 105, second bracket portion 107, and housing 102 cooperate to allow device 100 to be securely house video doorbell and allow easy mounting and unmounting of the device to a door. For example, in an embodiment, when second bracket portion 107 is coupled with first bracket portion 105, the outer surface of second bracket portion 107 is flush or substantially flush with the outer edges of housing, creating a planar surface for mounting to a door surface.

Figure 3:
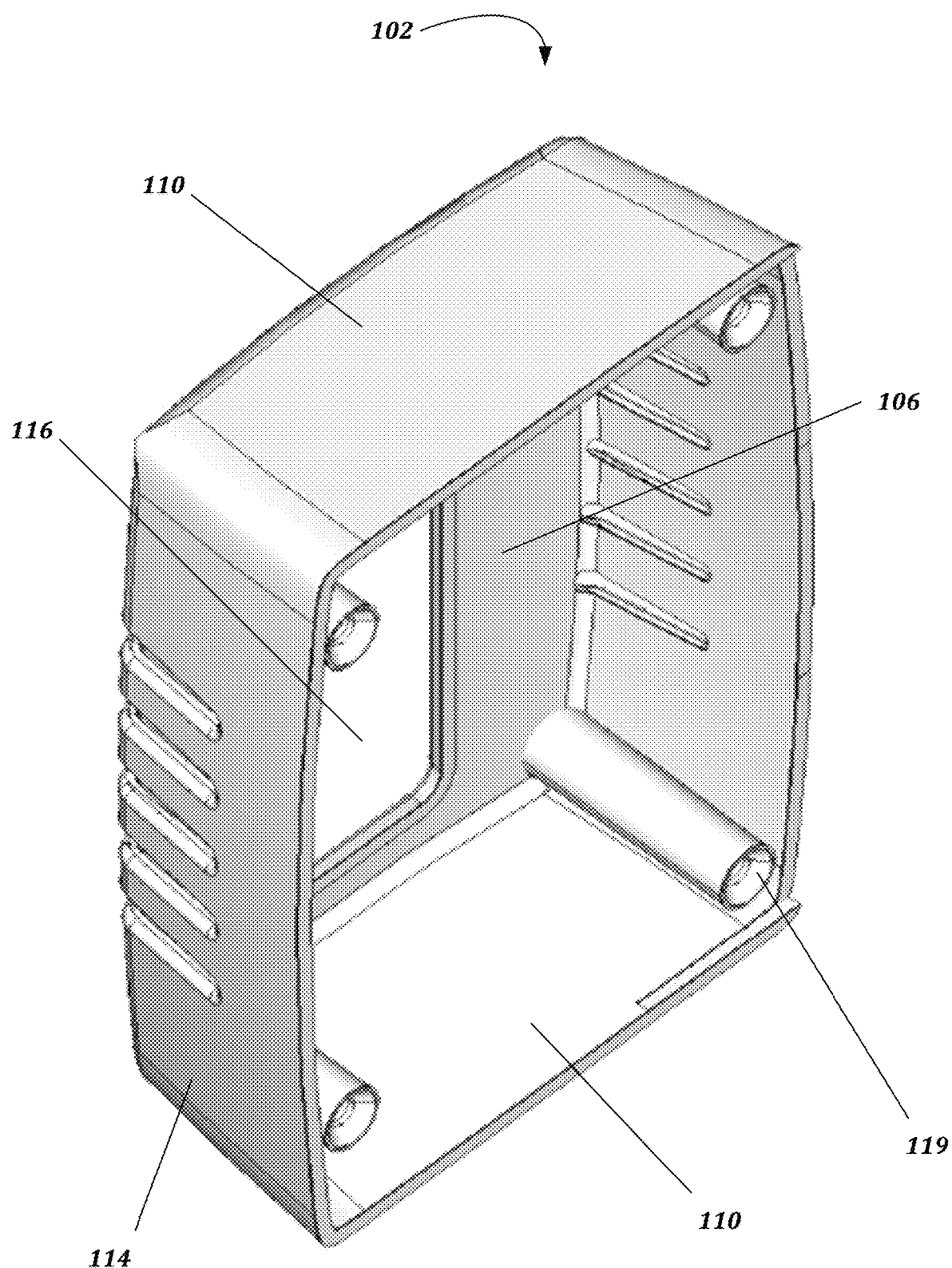
FIG. 3 shows a depiction of a housing for a device for securely mounting a video doorbell in accordance with an embodiment of the present disclosure.

FIG. 3 is rear view of an embodiment of housing 102 showing various additional details and features. As shown, housing 102 may include an open rear face 108 to accommodate a corresponding section of first bracket portion and fastener posts 119 for attaching first bracket portion. As shown, one edge 114a of a lateral side 114 may be recessed from the other edges to accommodate the thickness of the bracket assembly. While lateral side is shown as being recessed, the edge of top side or bottom side may be recessed depending on the desired mounting orientation of the device. Furthermore, first bracket portion may be attached using alternative attachment mechanisms other than mechanical fasteners, such as by sliding a corresponding bracket portion into a groove on the inner surfaces of the housing sides.

Figure 4:
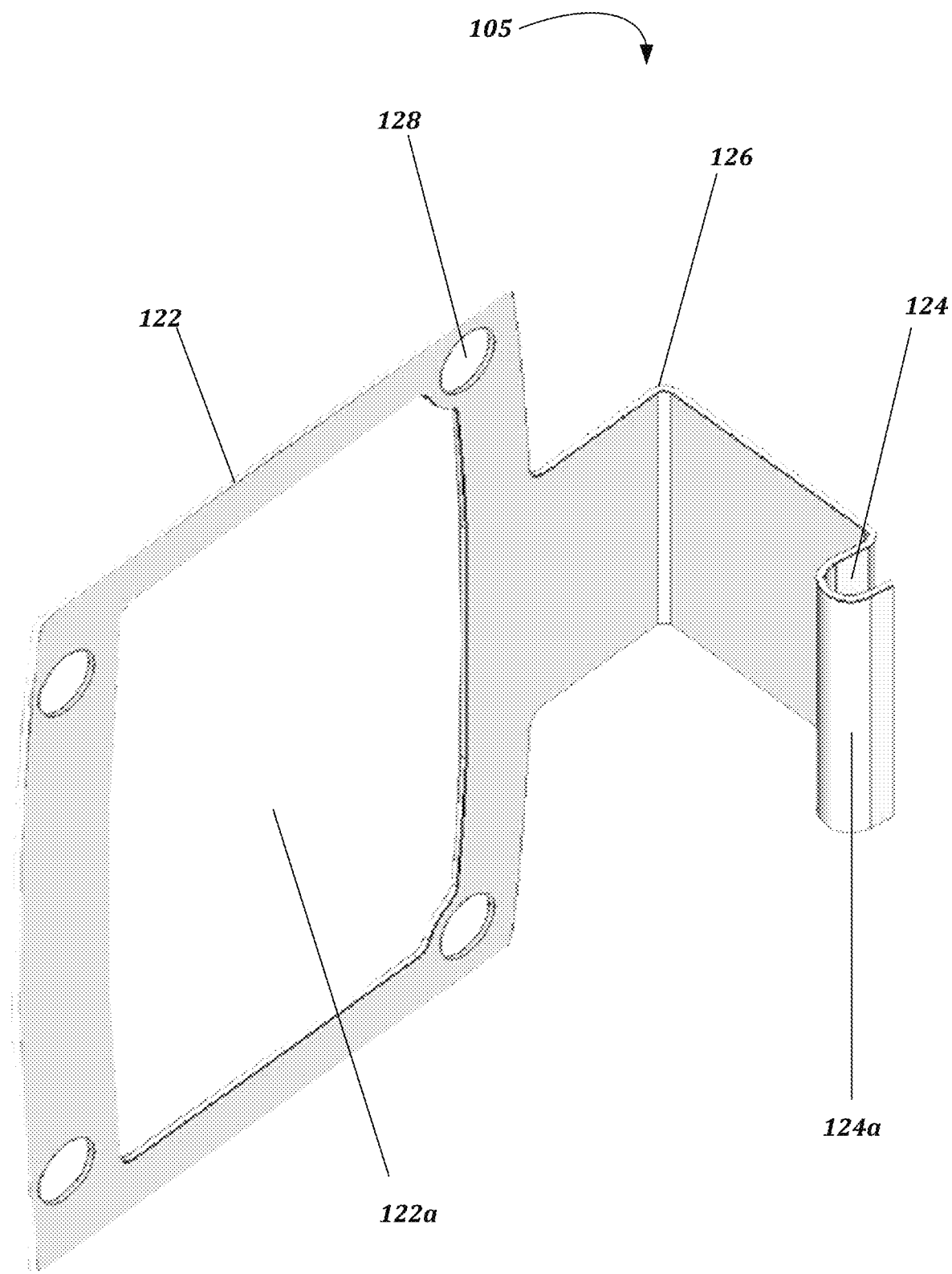
FIG. 4 shows a depiction of a bracket for a device for securely mounting a video doorbell in accordance with an embodiment of the present disclosure.

FIG. 4 is a view of an embodiment of first bracket portion 105 showing various additional features and details. As shown, first bracket portion 105 may include first mounting plate 122 with first mounting plate opening 122a, bracket ledge 124, and bracket member 126 extending from a first edge of said mounting plate to a first end of said bracket ledge. Bracket ledge 124 may include a hooked portion 124a, which extends or is formed from an opposed second end of said bracket ledge. First bracket portion 105 may further include fastener holes 128 corresponding to fastener posts 119 for attaching to housing 102 using fasteners 118. Hooked portion 124a is designed to prevent theft when installed on a door as described herein.

Figure 5:
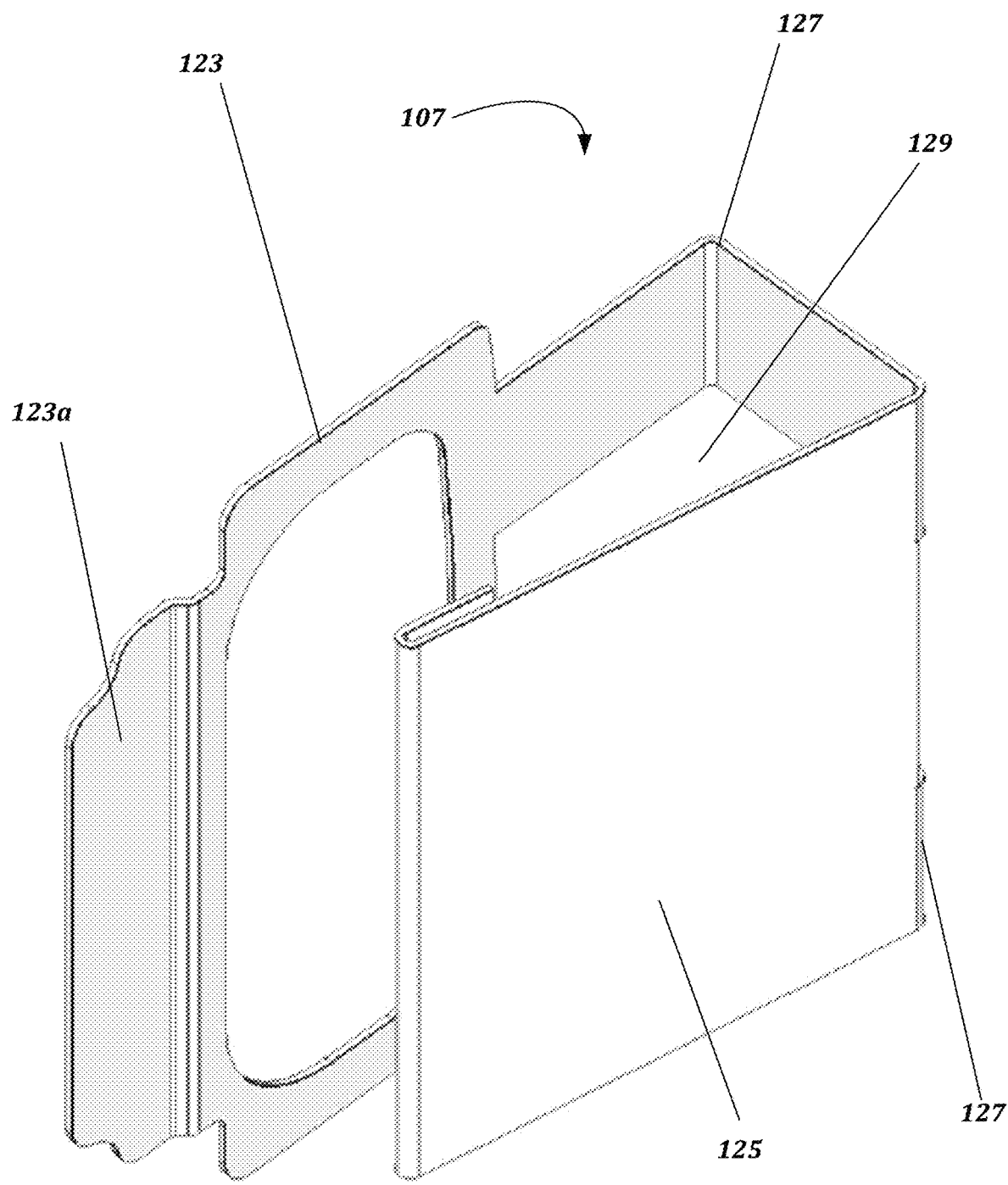
FIG. 5 shows a depiction of a bracket for a device for securely mounting a video doorbell in accordance with an embodiment of the present disclosure.
Figure 6A:
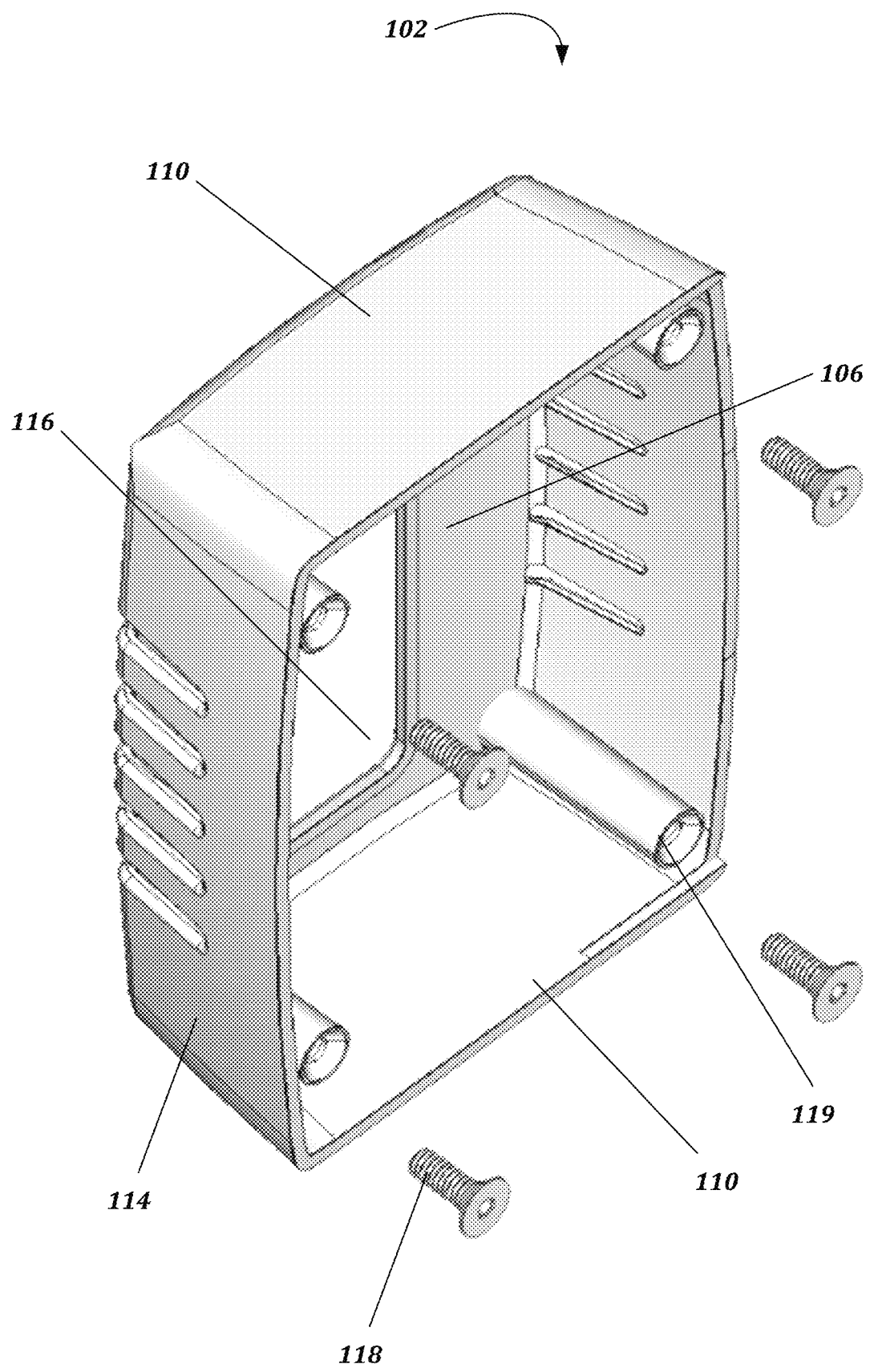
FIGS. 6A-6E show depictions of assembling a device for securely mounting a video doorbell in accordance with an embodiment of the present disclosure.
Figure 6B:
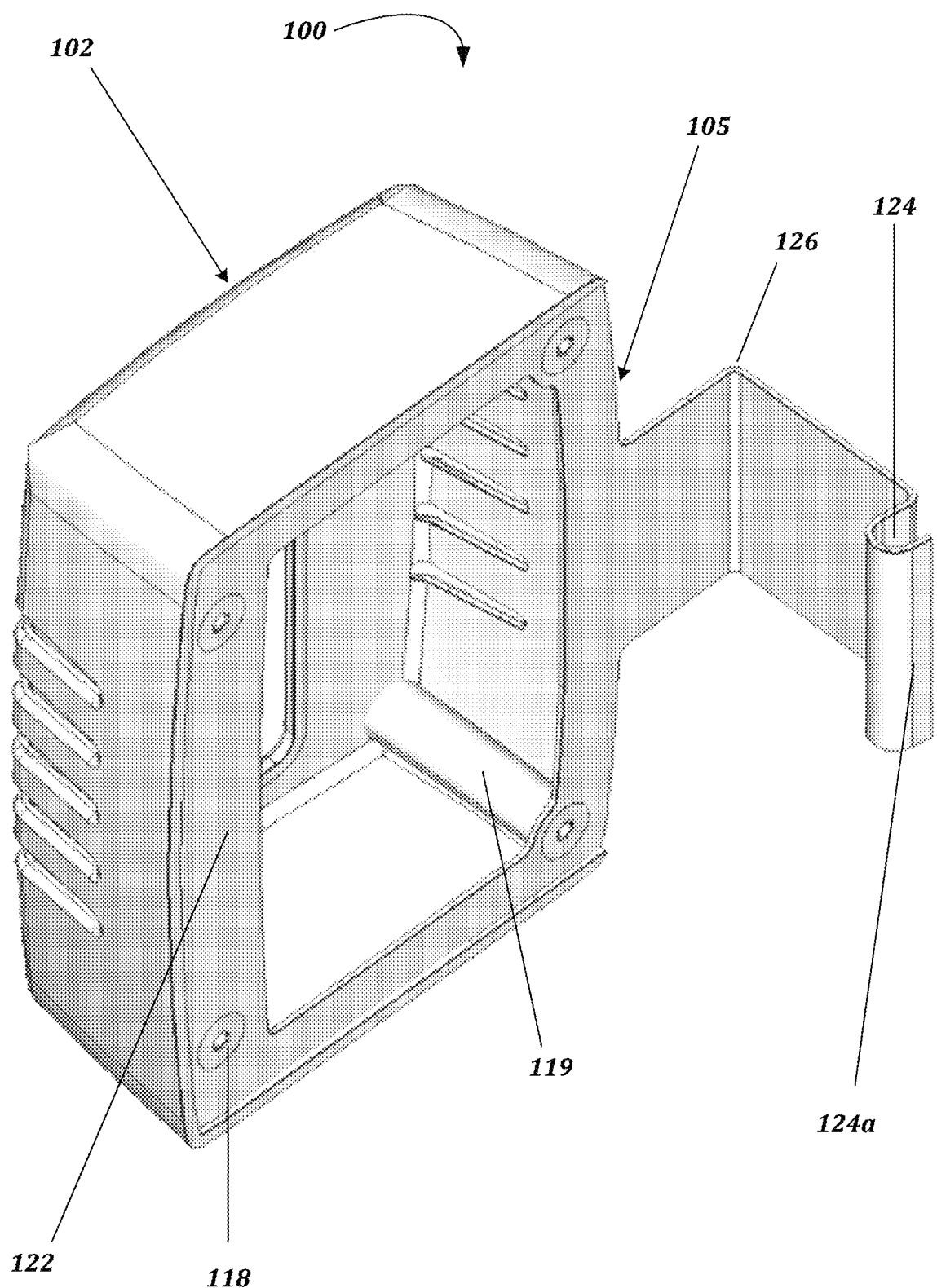
Figure 6C:
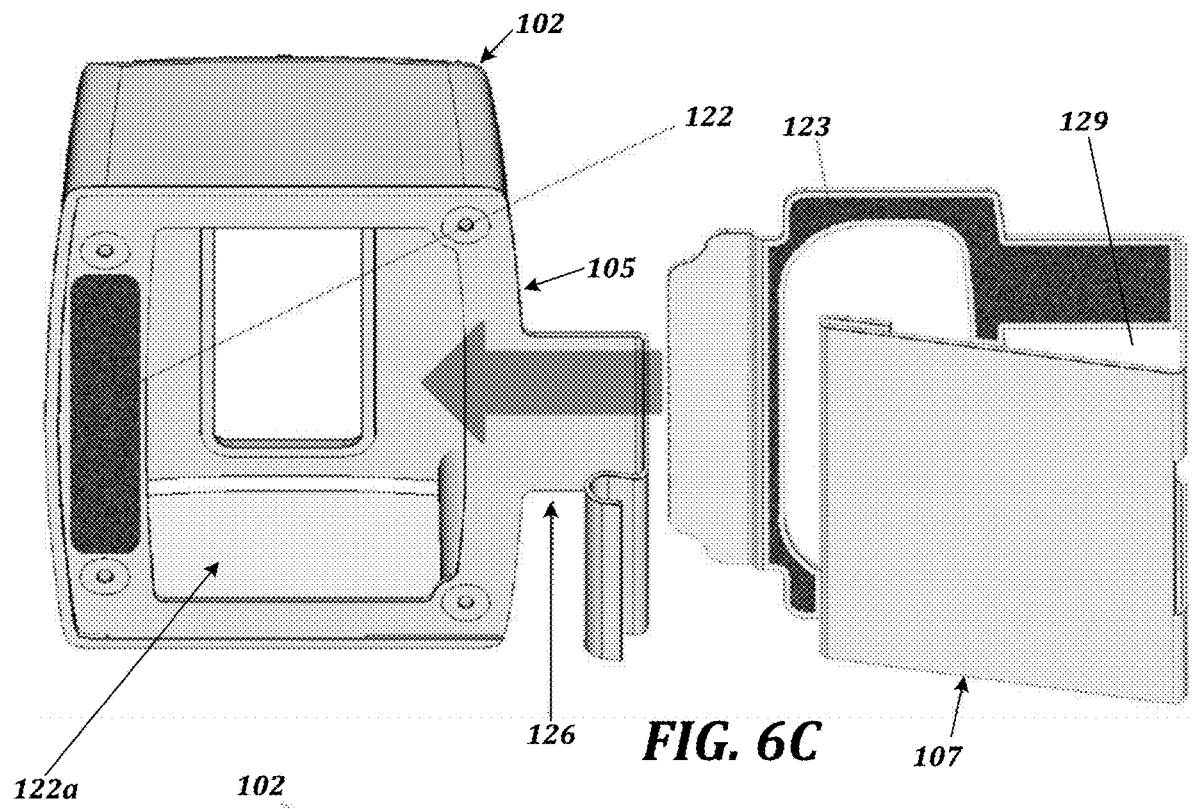
Figure 6D:
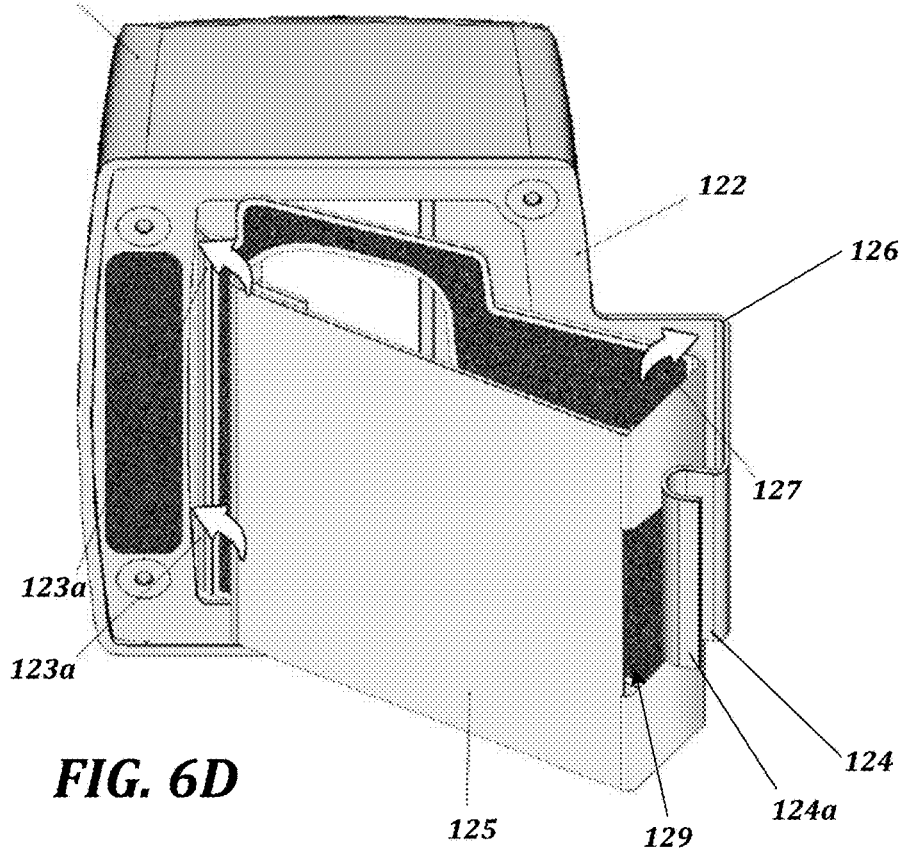
Figure 6E:
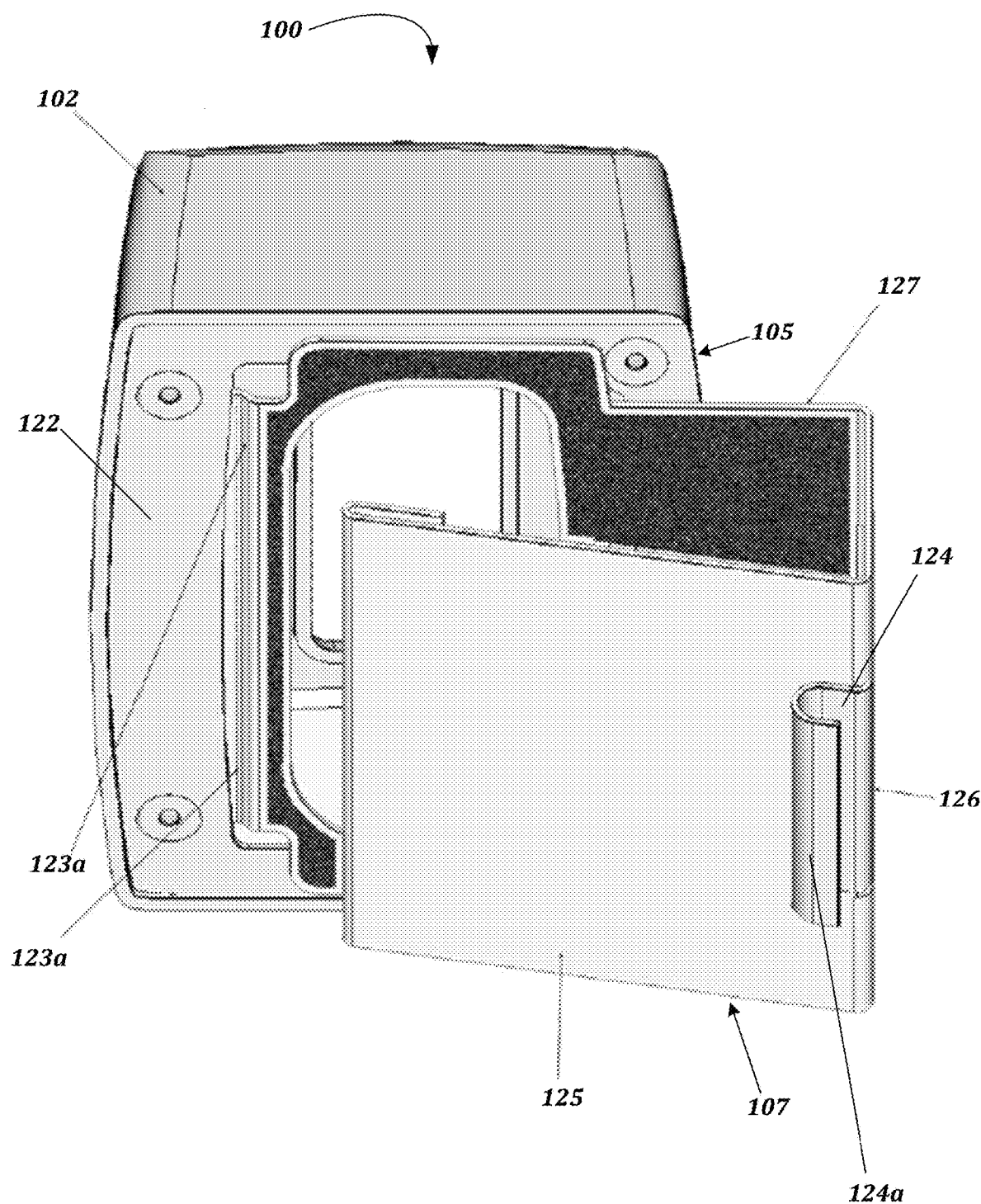
Figure 7A:
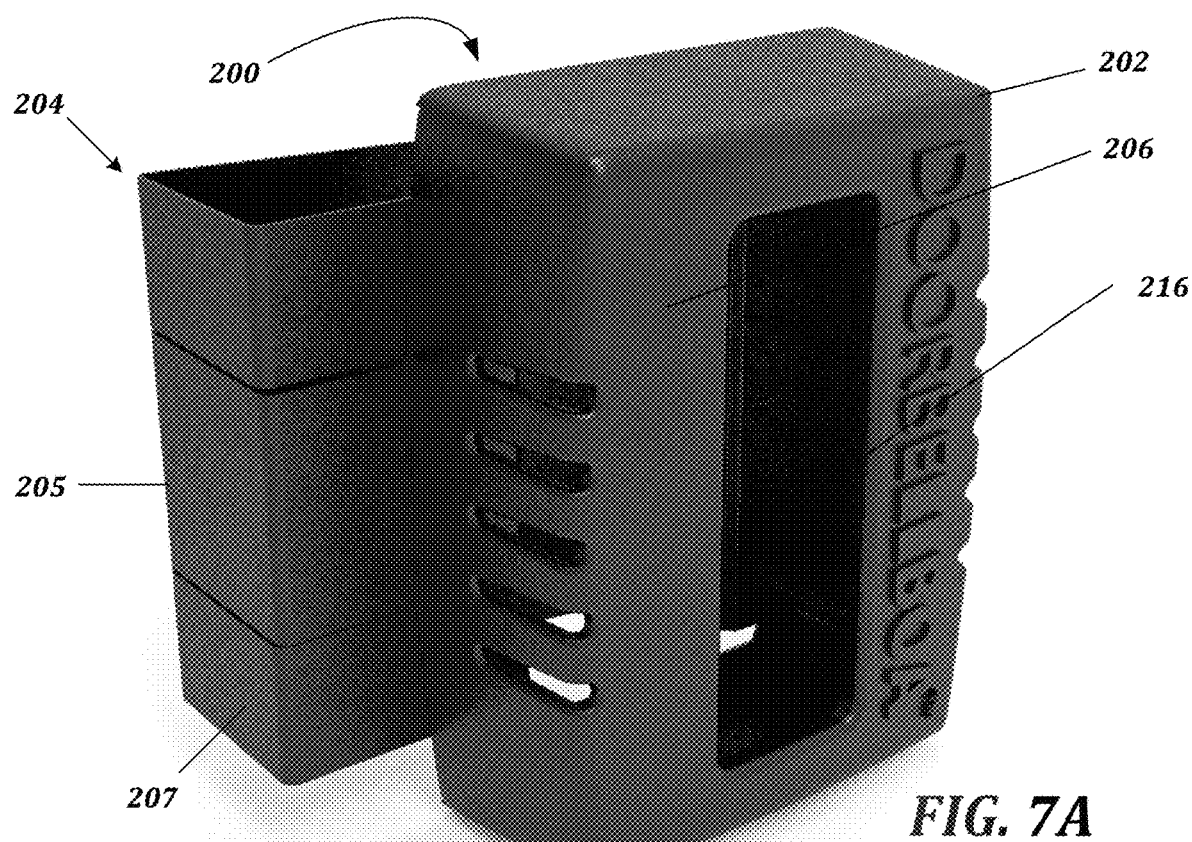
FIG. 7A-7F show depictions of mounting a device for securely mounting a video doorbell in accordance with an embodiment of the present disclosure.
Figure 7B:
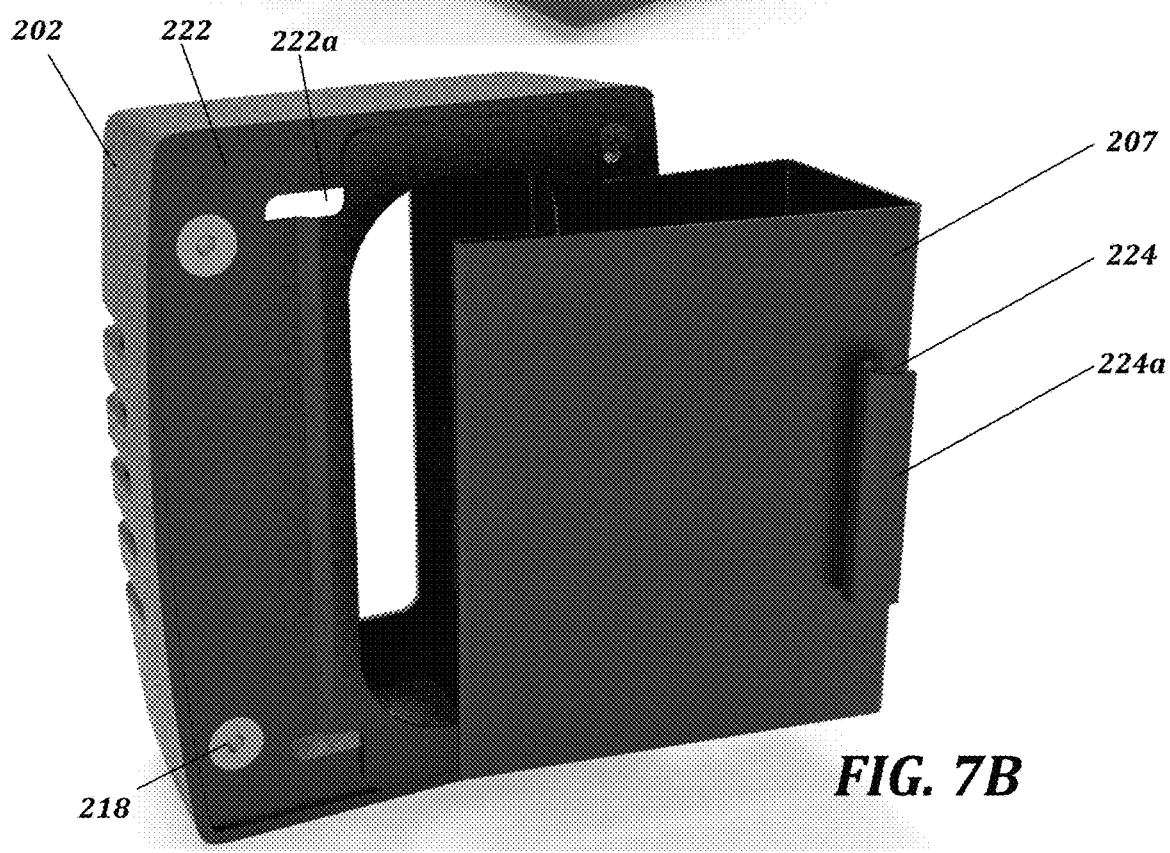
Figure 7C:
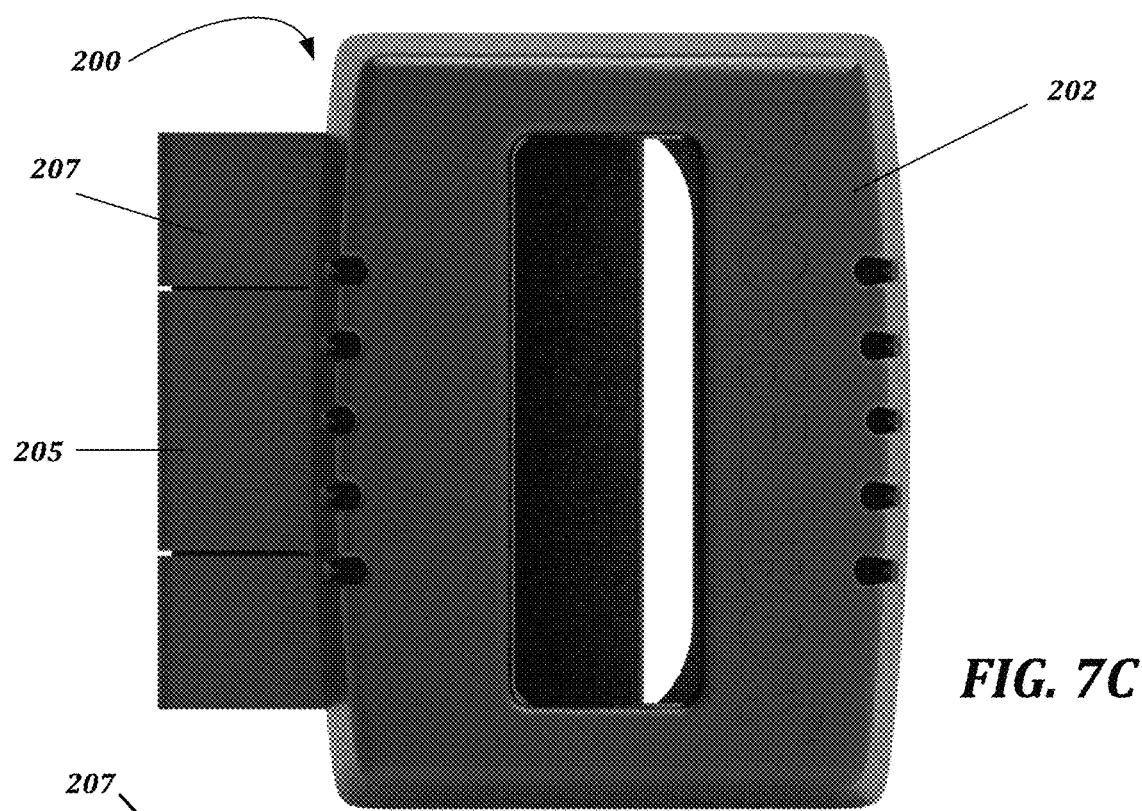
Figure 7D:
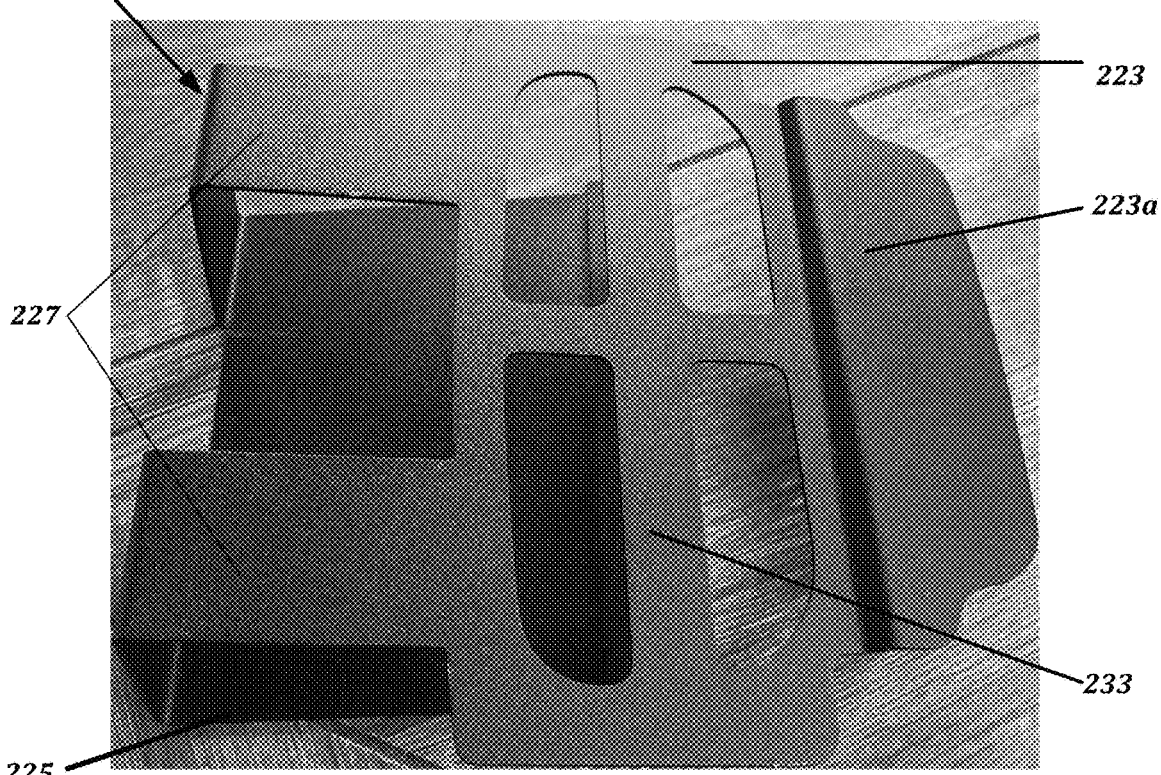
Figure 7E:
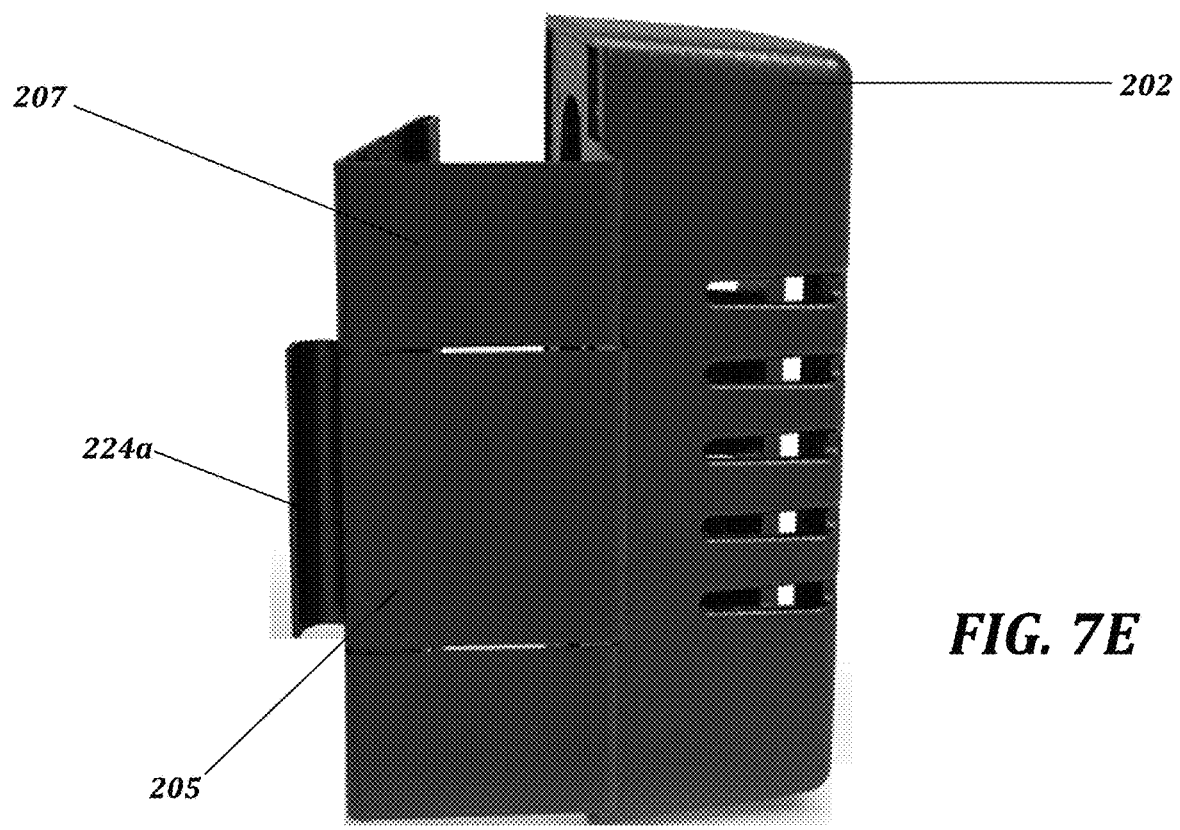
Figure 7F:
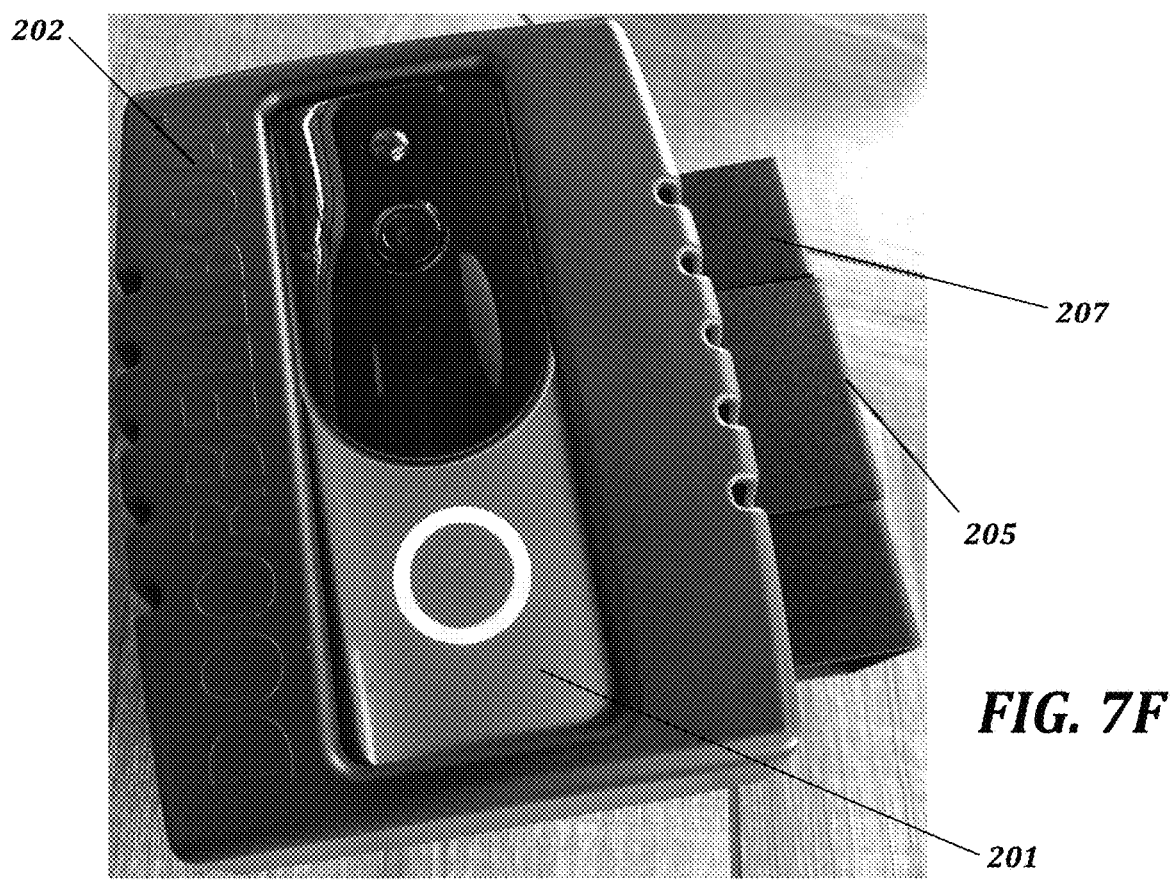

FIG. 5 is a view of an embodiment of second bracket portion 107 showing various additional details and features. As shown, second bracket portion 107 may include mounting plate 123, a back plate 125, first and second bracket members 127 both extending from a first edge of said mounting plate 123 to a first edge of said back plate 125, and tongue 123a extending from an opposed second edge of said mounting plate 123. First and second bracket members 127 define opening 129 therebetween. Tongue 123a is configured to couple using first mounting plate opening 122a, while opening 129 is configured to receive bracket member 126 from first bracket portion therebetween, and bracket ledge 124 securely engage back plate 125.

FIGS. 6A-6E are additional detailed views of device 100 showing various components and additional features, and method for assembling. As shown, housing 102 may comprise an open container including fastener posts 119 for attaching housing 102 with a bracket using fasteners 118. In the embodiment shown in FIG. 6B, first or inner bracket 105 may be fastened using fastener holes 128 corresponding to fastener posts 119 for attaching housing 102 using fasteners 118. In an alternative embodiment, first or inner bracket 105 may be attached without using fasteners, such as using grooves disposed on corresponding inner surfaces of the housing walls. To this end, the bracket can be slid into such grooves using friction fit, while the fastener post can optionally be present as support posts. Once inner bracket 105 is attached to housing 102, second or outer bracket 107 can be coupled with inner bracket 105 using friction. Ledge 123a is inserted into opening 122a against an edge of mounting plate 122, while a portion of member 126 is disposed in opening 129 and bracket ledge 124 securely engages back plate 125. Hooked portion 124a can prevent theft when installed on a door as described herein. In some embodiments, one lateral wall (or left or right wall, depending on desired installation orientation) may be shorter in height compared to the other walls to accommodate the thickness of the bracket. In other embodiments, one top or bottom wall (depending on desired installation location, i.e., top or bottom of the door) may be shorter in height compared to the other walls to accommodate the thickness of the bracket. To this end, one housing wall may be shorter in an amount equal to the thickness of the installed bracket. When the bracket is installed, the outermost surface of bracket may be flush or substantially even with the other housing walls.

FIGS. 7A-7F are views of device 200 comprising housing 202, two-piece bracket assembly 204, and showing various components and additional features in accordance with another embodiment of the present invention. As shown, housing 202 may include an outward-facing front face 206 with opening 216 configured and dimensioned to allow interaction and operation of a video doorbell 201 contained therein, an inward-facing open rear face, a top wall, a bottom wall, and opposed lateral wall. Bracket assembly 204 includes an inner bracket 205 configured to releasably attach to rear face of housing using fasteners 218, and outer bracket 207 configured to detachably couple with inner bracket 205. Inner bracket 205, outer bracket 207, and housing 202 cooperate to allow device 200 to be securely house video doorbell and allow easy mounting and unmounting of the device to a door. Inner bracket 205 includes mounting plate 222 with mounting plate opening 222a, bracket ledge 224, and bracket member 226 extending from a first edge of mounting plate to a first end of said bracket ledge. Bracket ledge is configured to securely couple with an outer portion of outer bracket 207, and may include anti-theft hooked portion 224a, which extends or is formed from an opposed second end of said bracket ledge. Inner bracket 205 may further include fastener holes corresponding to housing fastener posts for attaching to housing 202 using fasteners 218. Open rear face of housing is sized and dimensioned to accommodate mounting plate 222. Hooked portion 224a is designed to prevent theft when installed on a door as described herein. Outer bracket 207 may include mounting plate 223, a back plate 225, first and second bracket members 227 both extending from a first edge of said mounting plate 223 to a first edge of said back plate 225, and tongue 223a extending from an opposed second edge of said mounting plate 223. First and second bracket members 227 define an opening therebetween. Tongue 123a is configured to couple using first mounting plate opening 222a, while opening 229 is configured to receive bracket member 226 from first bracket portion therebetween, and bracket ledge 224 securely engage back plate 225. Mounting plate 223 of outer bracket may comprise cross members 233 in its opening. As shown, one edge of a lateral or top or bottom wall may be recessed from the other edges to accommodate the thickness of the bracket assembly. While lateral side is shown as being recessed, the edge of top side or bottom side may be recessed depending on the desired mounting orientation of the device. Furthermore, alternative attachment mechanisms other than mechanical fasteners can be used, such as by sliding a corresponding bracket portion into a groove on the inner surfaces of the housing sides.

Figure 11:
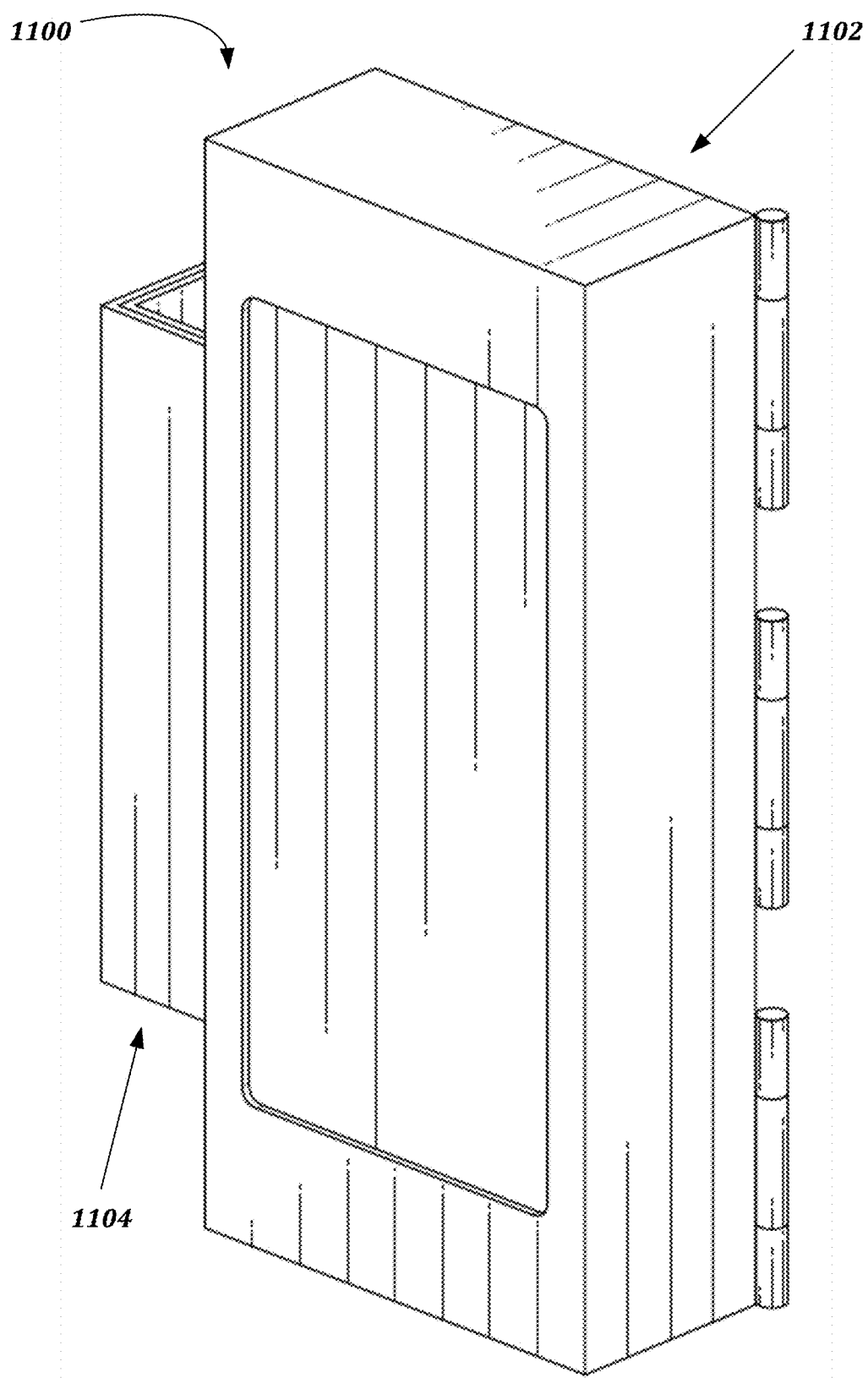
FIG. 11 shows a depiction of a device for securely mounting a video doorbell in accordance with another embodiment of the present disclosure.
Figure 12:
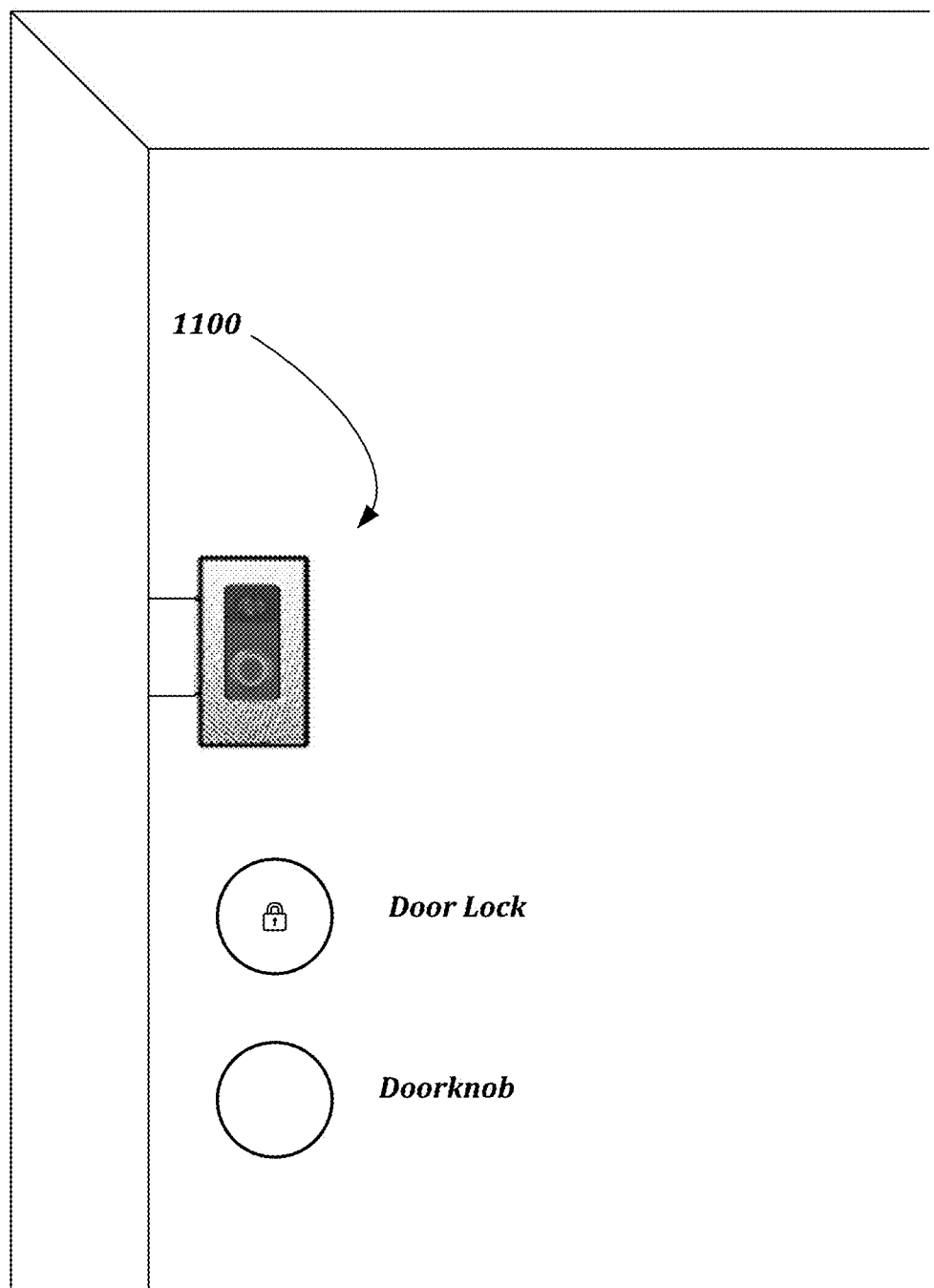
FIG. 12 shows a depiction of a device for securely mounting a video doorbell installed on a door in accordance with an embodiment of the present disclosure.
Figure 13:
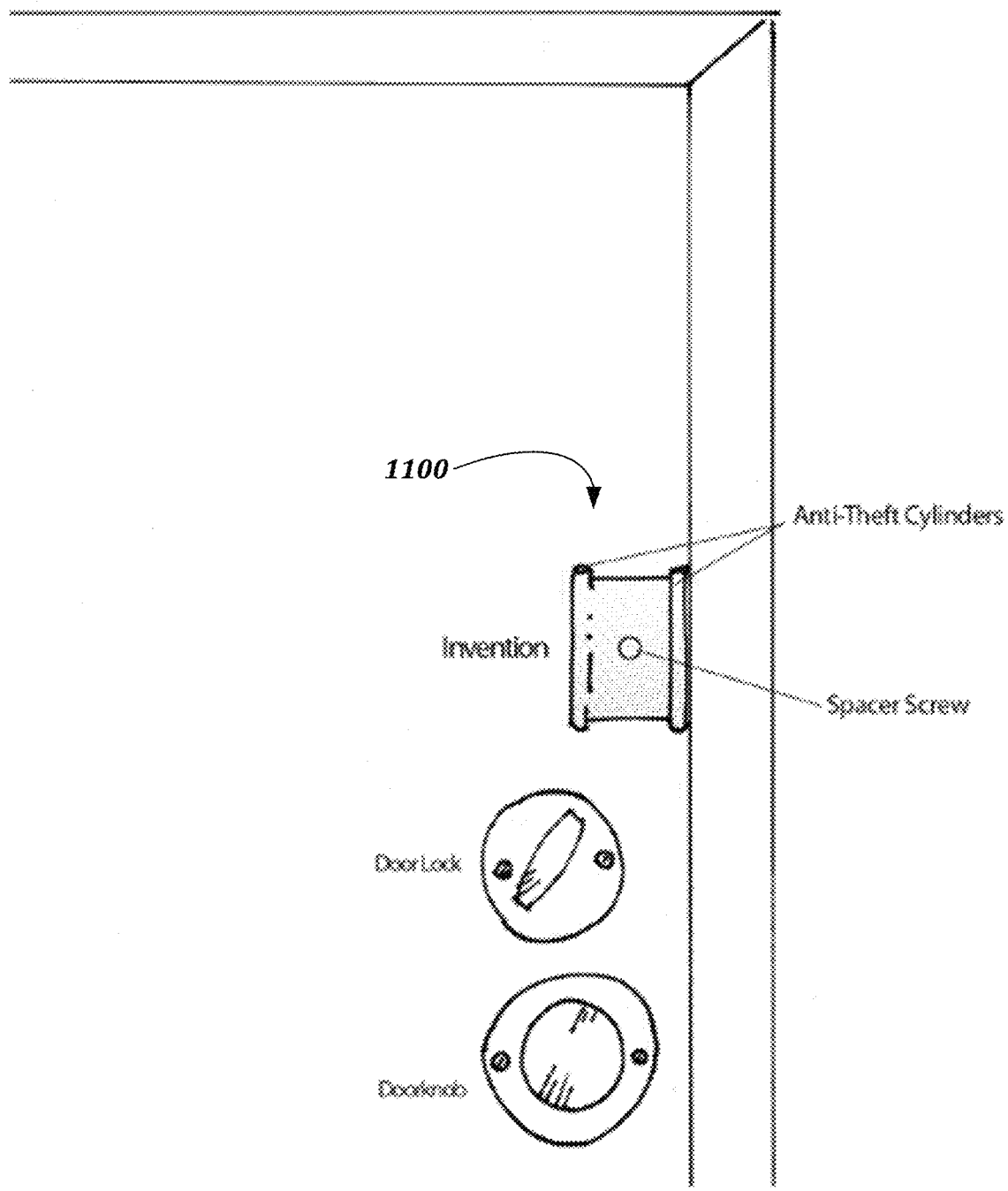
FIG. 13 shows a depiction of a device for securely mounting a video doorbell installed on a door in accordance with another embodiment of the present disclosure.
Figure 14A:
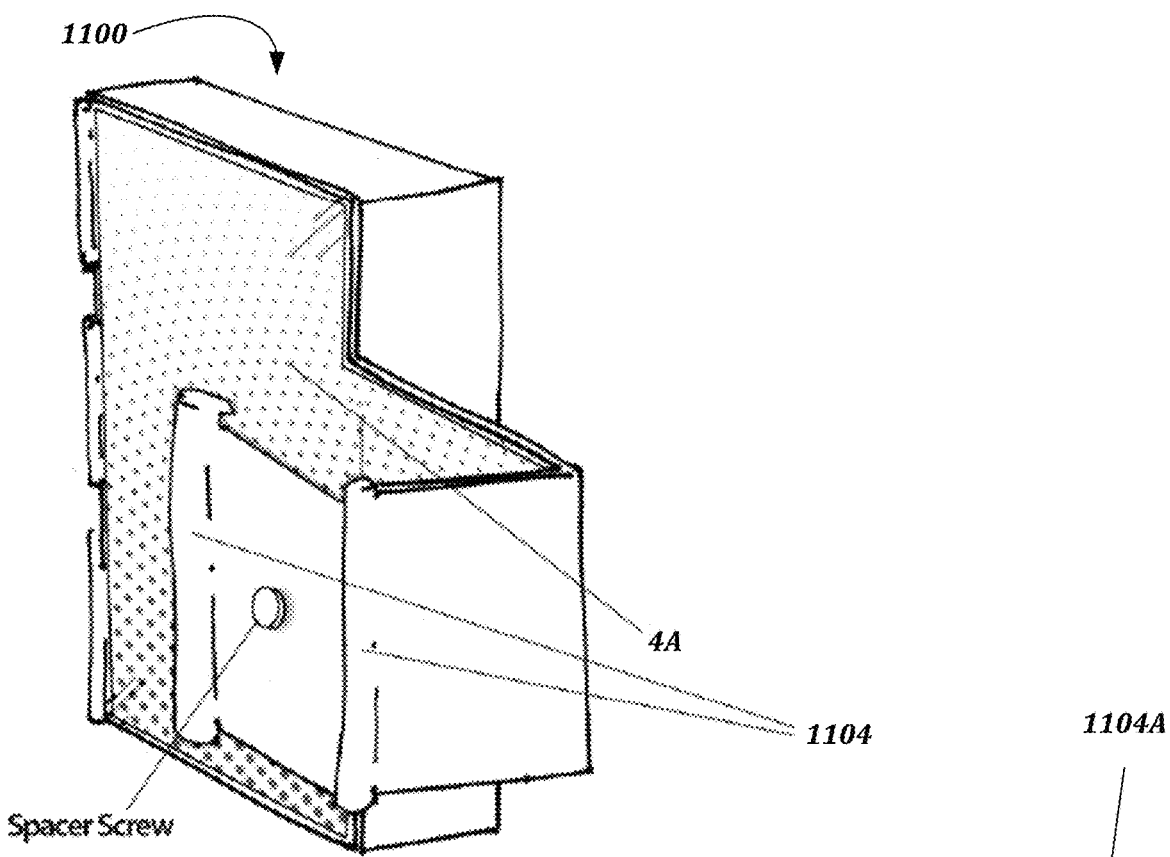
FIGS. 14A-14B show depictions of a device for securely mounting a video doorbell in accordance with an embodiment of the present disclosure.
Figure 14B:
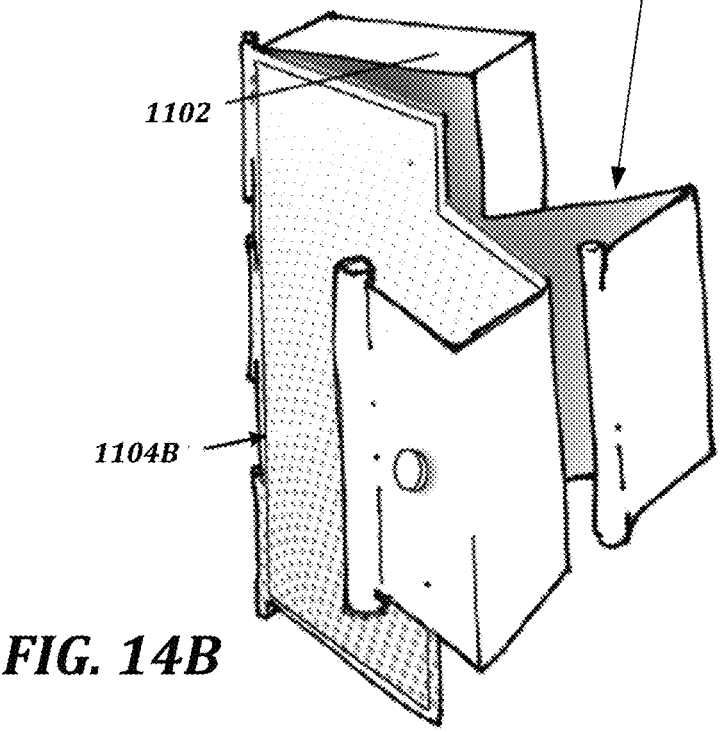
Figure 15:
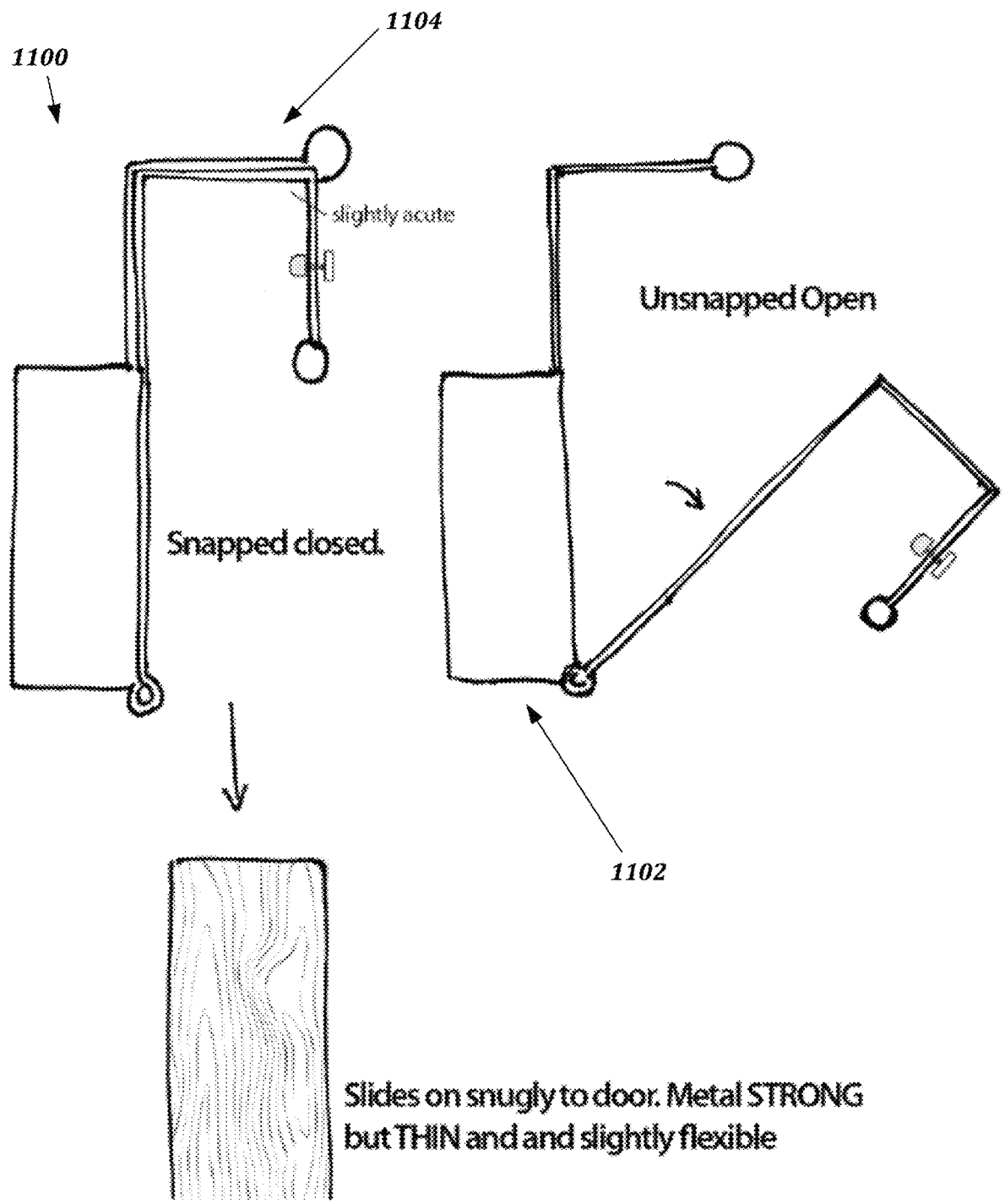
FIG. 15 shows a depiction of a device and method for securely mounting a video doorbell in accordance with an embodiment of the present disclosure.
Figure 16:
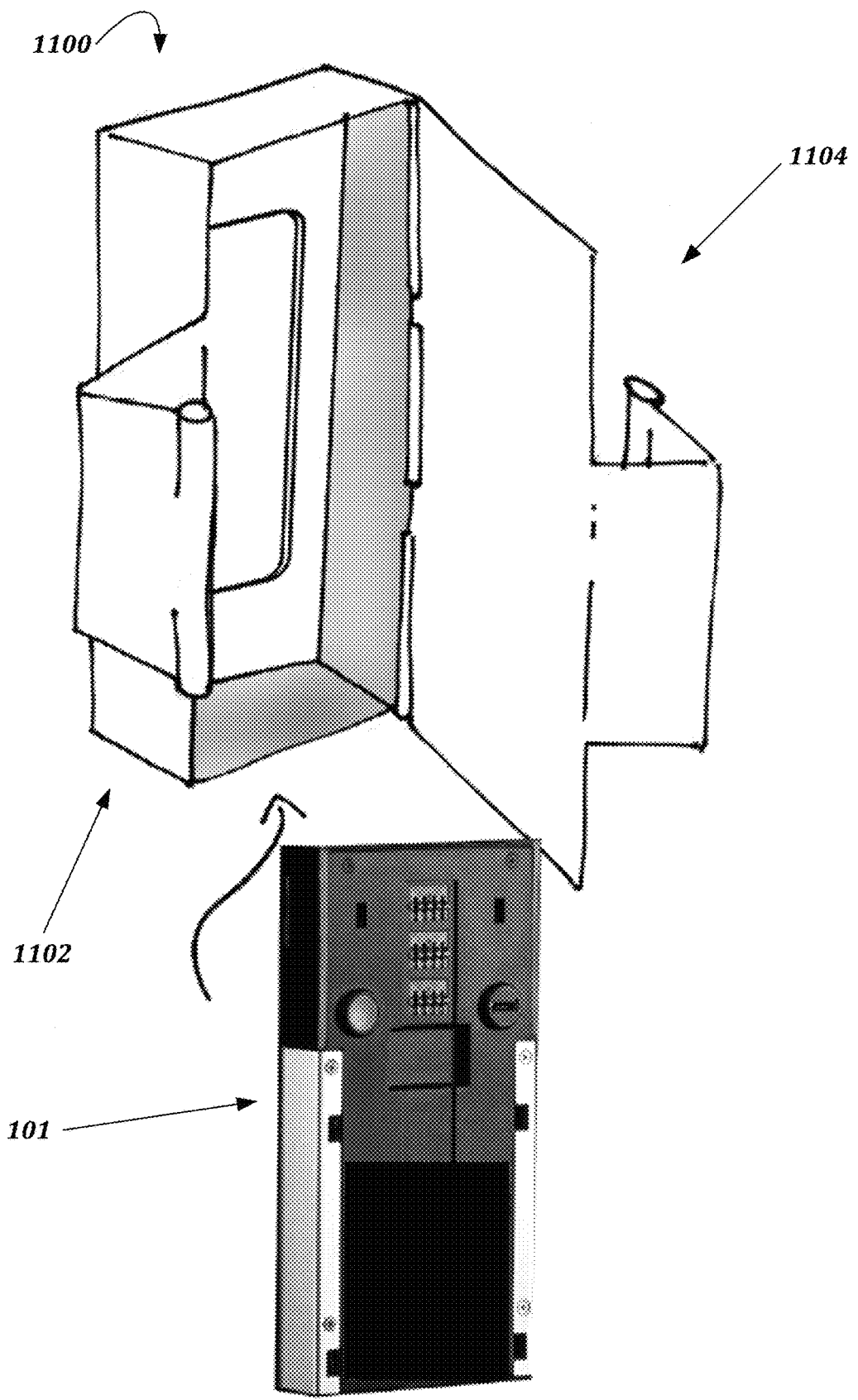
FIG. 16 shows a depiction of a device and method for securely mounting a video doorbell in accordance with an embodiment of the present disclosure.

FIGS. 11-16 show various view another embodiment of a video doorbell container device 1100 for securely housing a video doorbell 101 in accordance with the present invention. Container device 1100 generally includes housing 1102 with bracket 1104 for removably mounting the container device to an object, such as a door. FIG. 11 depicts a front angled view of a video doorbell container device with an opening that exposes the doorbell camera and doorbell button to guests. In various aspects, the dimensions of the opening and container will vary based on the video doorbell model. FIG. 12 depicts a front door exterior view of the video doorbell container device 1100 secured to the door with a sample video doorbell inside. The acute angled brackets 1104, attached to the video doorbell container device 1100, wrap around the side of the door from the outside to the inside. In some embodiments, a non-sliding and non-abrasive compressible layer of soft material may be disposed on the inside. FIG. 13 depicts an entry door interior view of video doorbell container device 1100 secured to the door. acute angled brackets 1104, attached to the video doorbell container device 1100, wrap around the side of the door from the outside to the inside. The double brackets 1104 are a thin durable material, such as non-rusting metal, and are designed to fit one inside the other and still fit between the door's jamb and the door. The attached anti-theft metal cylinder masses at the end of each bracket piece are both larger than the closed door's very minimal opening. This helps keep the video doorbell container device 1100 from being stolen or pulled away from the door. The spacer screw can be twisted to adjust to thinner doors. FIGS. 4A-4B depict back views of video doorbell container device 1100. The video doorbell container device 1100 may be made of durable material, such as a non-rusting lightweight metal. The actual video doorbell 101 is placed inside video doorbell container device 1100 and locked inside unless the door is opened. 4A refers to a thin layer of soft non-abrasive and non-sliding material, while 1104 refers to the container brackets, wherein the ends of each bracket may have security cylinder shaped solid metal tubes that keeps the device from being pulled from outside. 1104A refers to container outside bracket portion. The container device being designed specifically to house a video doorbell device (e.g., RING™ or ADT™ video doorbell) with a cylinder mass that ends at the edge of the inner door. 1104B refers to container inside bracket portion, the back cover being designed to lock the video doorbell inside the housing, which in various aspects, cannot be opened unless the door is opened and is raised from its snapped position. The hook portion on the bracket may be longer and reaches further around the door with a cylinder mass to keep it secure from being pulled from the outside. Container bracket hooks around the side of the door using thin durable metal constricts very snugly to the door using acute angles. FIG. 5 depicts a top view of the video doorbell container device 1100 which shows the process of sliding the invention onto the door. This figure also shows the inside bracket portion unsnapped and open. The video doorbell container device 1100 slides on snugly to door. The container's material is strong but thin and slightly flexible. FIG. 6 depicts a back view of video doorbell container device 1100 with a sample video doorbell device displayed. The video doorbell is placed inside the video doorbell container device 1100 and back is closed and snapped in place. Video doorbell container device 1100 can be configured for either left-sided and/or right-sided installation.

D. Device and System Operation and Methods for Using Same

Also disclosed herein are methods of making and using the disclosed devices, apparatuses and systems. For example, in another exemplary aspect, the present disclosure provides a method for securely mounting a video doorbell using a disclosed device or system. In further aspects, the device may be removably mounted to a door.

Figure 8:
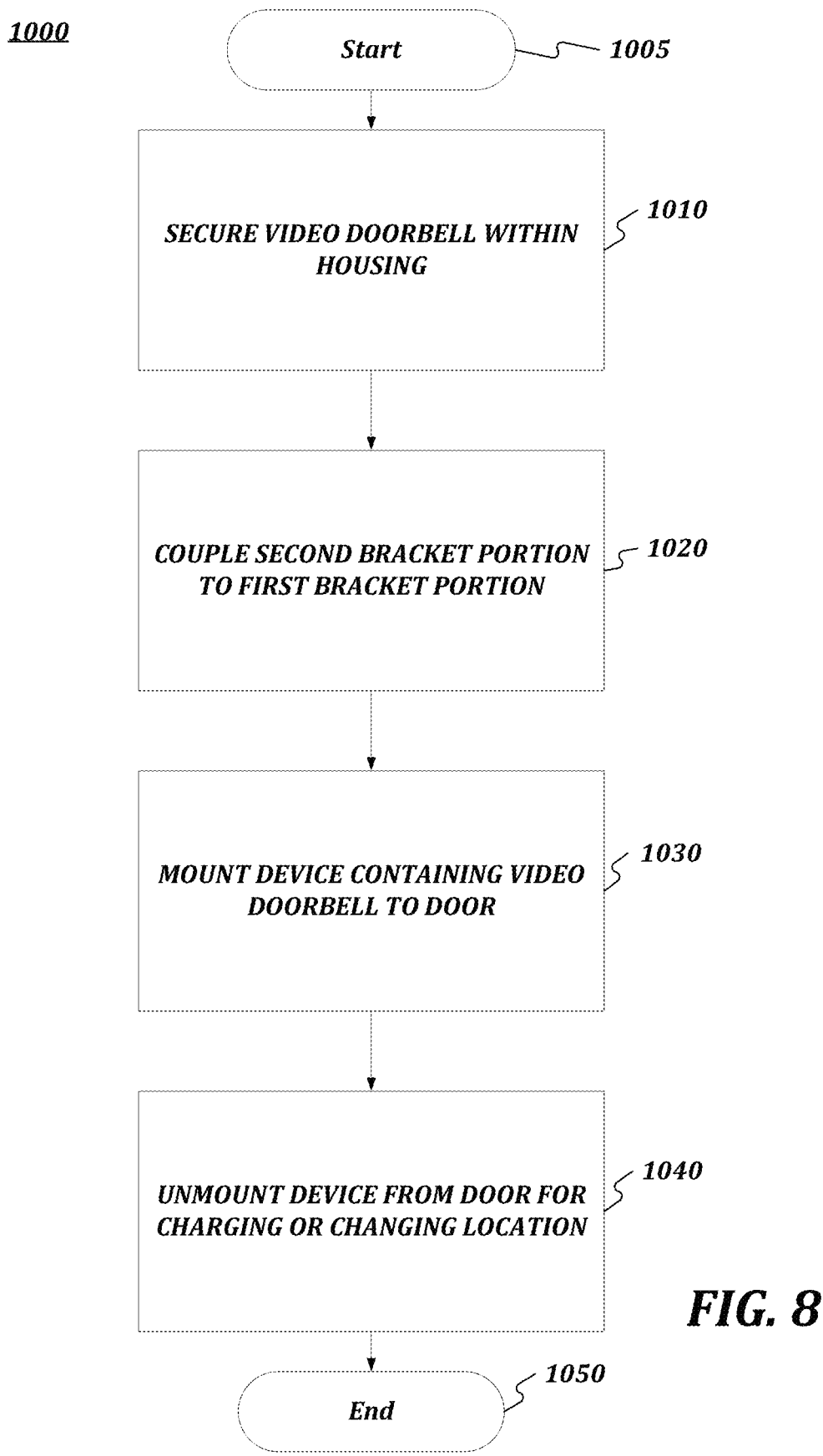
FIG. 8 is a flow chart of a method for securely mounting a video doorbell using a disclosed device in accordance with an embodiment of the present disclosure.

FIG. 8 is a flow chart and FIGS. 9A-10H are depictions setting forth various stages involved in a method 1000 consistent with an embodiment of the disclosure for using the disclosed devices and systems. Method 1000 may be implemented using, at least in part, for example, device 100, or 200, 1100, as described in more detail with respect to FIGS. 1-16.

Device 100 may comprise housing 102 and bracket assembly 104 for operating the device components. Furthermore, although stages are disclosed with reference to device 100, it should be understood that other disclosed device embodiments may enable the operation of method 1000, including, but not limited to, other device mechanisms, mechanical components, environment properties (e.g., humidity, rain, etc.), user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Figure 10A:
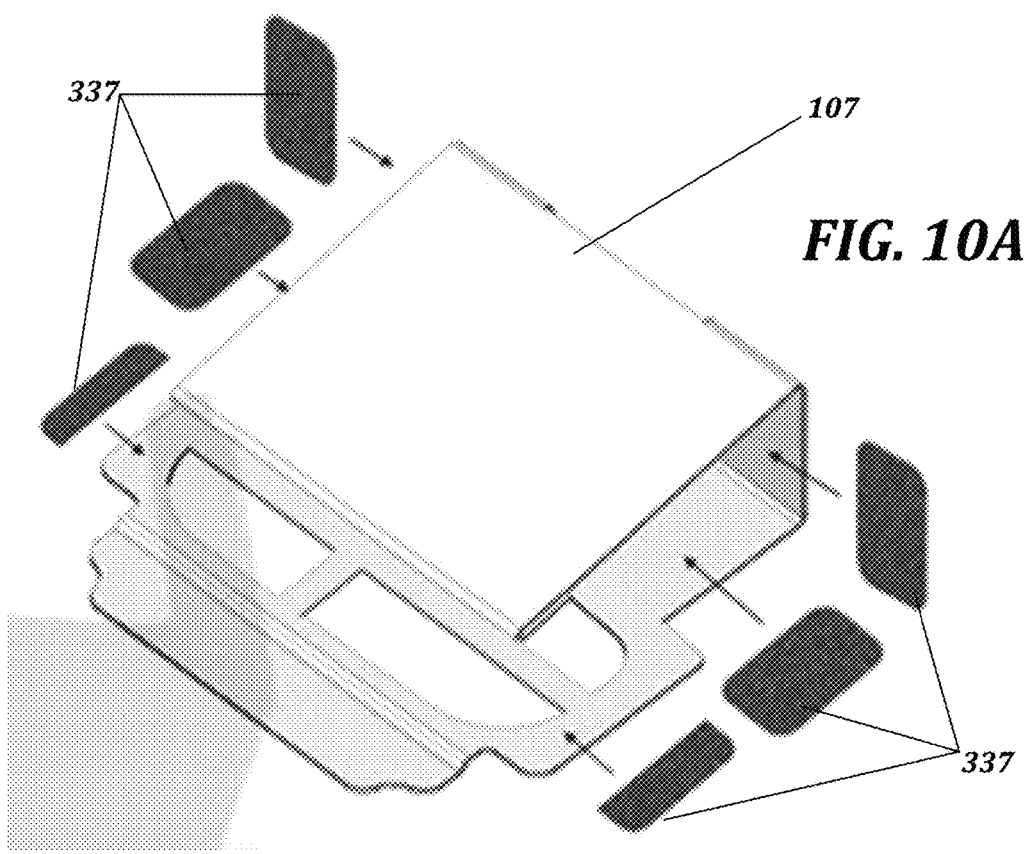
FIGS. 10A-10H show depictions of a device and method for securely mounting a video doorbell in accordance with an embodiment of the present disclosure.
Figure 10B:
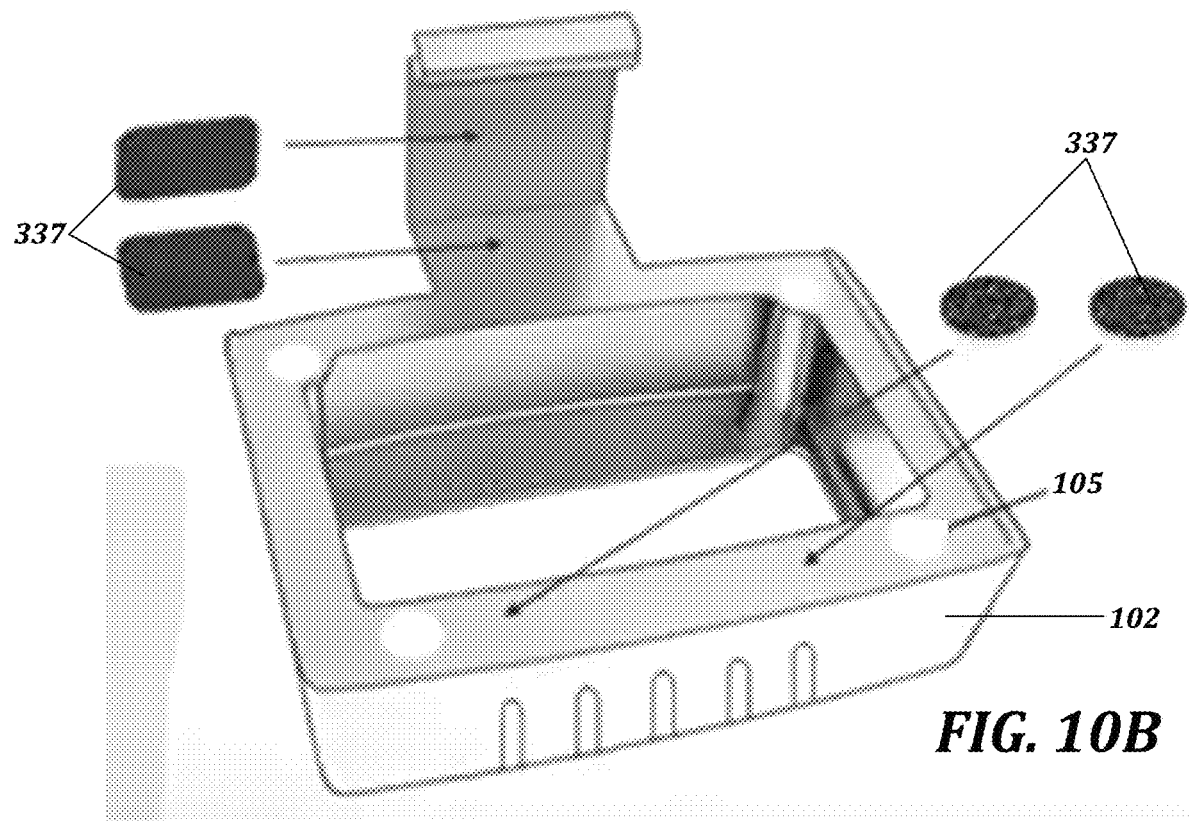
Figure 10C:
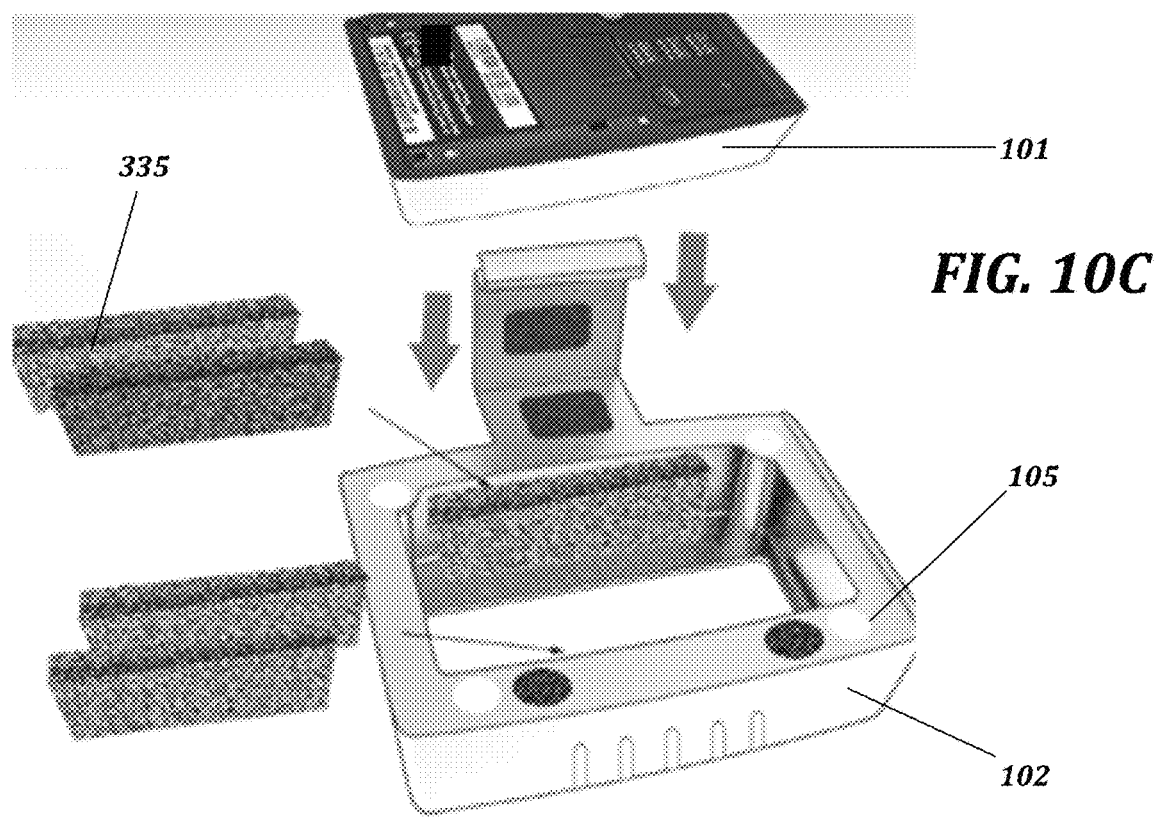
Figure 10D:
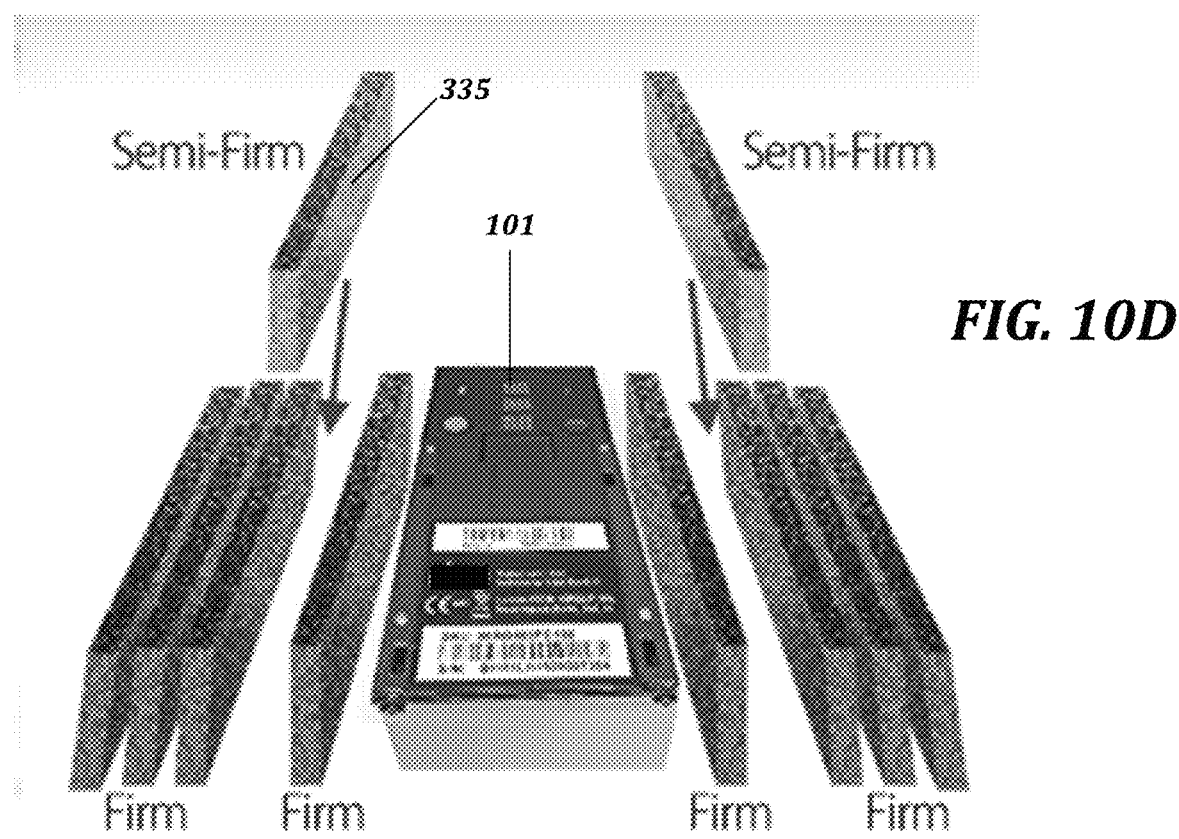

Method 1000 may begin at starting block 1005 and proceed to stage 1010, where the video doorbell can be positioned within the housing. The video doorbell can be secured in the desired position using stabilizing component or securing component such as fasteners, tension or spring elements, or firm and semi-firm foam braces, or the like. As shown in FIGS. 10C-10D, securing component 335 in form of firm and semi-firm foam braces are used to secure the video doorbell in the desired position within housing 102. In some embodiments, an equal amount of foam braces may be used on each side to keep the video doorbell centered. A semi-firm foam brace may be placed between the firmer braces when addition give or travel within the housing is desired. As shown in FIGS. 10A-10B, the device may further comprise non-abrasive material 337, such as felt or the like, on various surfaces of the bracket that correspond to areas of the bracket that contact the door surface when sliding or mounting the device on a door.

Figure 10E:
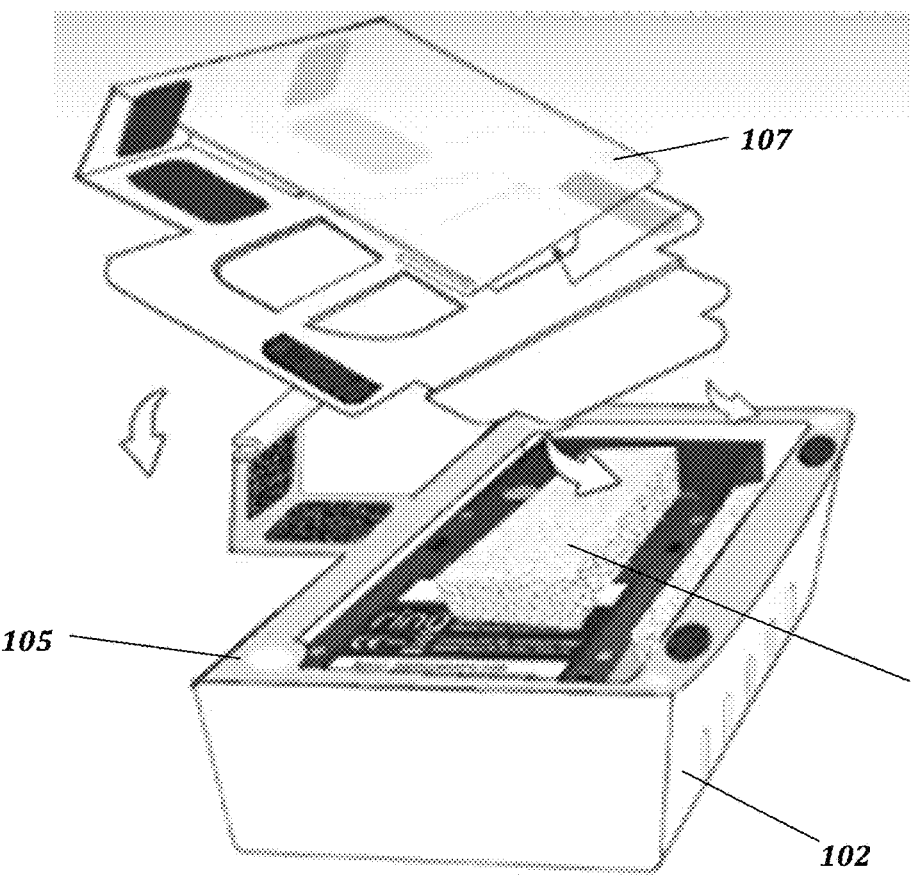
Figure 10F:
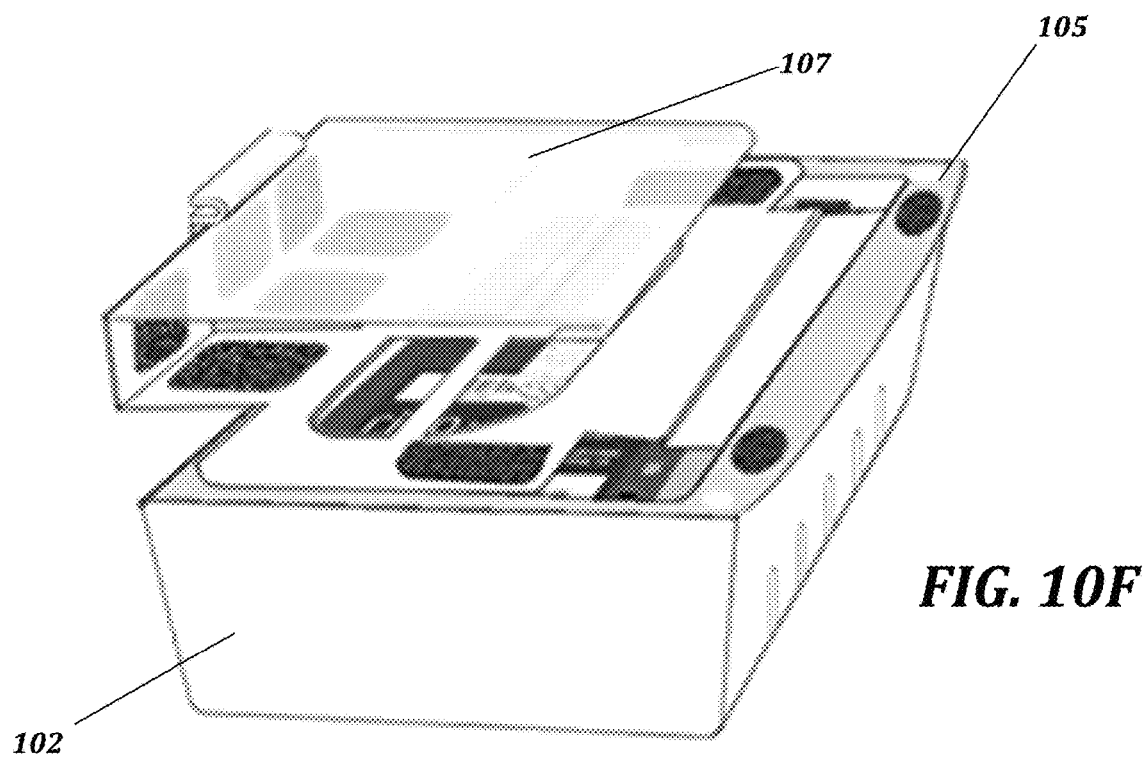

From stage 1010, where the video doorbell is securely positioned within the housing of the device, method 1000 may proceed to stage 1020 where the second bracket portion can be coupled to the first bracket portion. As shown in FIGS. 6C-6E and 10E-10F, the tongue of second bracket portion is inserted into mounting plate opening of first bracket portion secured to housing, where a corresponding portion of mounting plate of first bracket portion serves as a ledge for keeping the corresponding section of second bracket portion in place. After the tongue is positioned against first bracket portion, the remaining section of second bracket portion is coupled with remaining section of first bracket portion. Specifically, the opening formed between first and second bracket members of second bracket portion is located and sized to receive bracket member from first bracket portion. The bracket ledge at the end of bracket member from first bracket portion frictionally engages the back plate of second bracket portion to fully couple the bracket portions together. In further aspects, the first bracket portion may be configured such that there is a dip or recess between the mounting plate and bracket member to accommodate the thickness of bracket member of second bracket portion, such that all bracket members may be flush or substantially flush with one another when the bracket portions are coupled. As shown in FIG. 10E, one or more foam braces may be placed behind the video doorbell prior to coupling the bracket portions together to ensure the video doorbell does not shift.

Figure 9A:
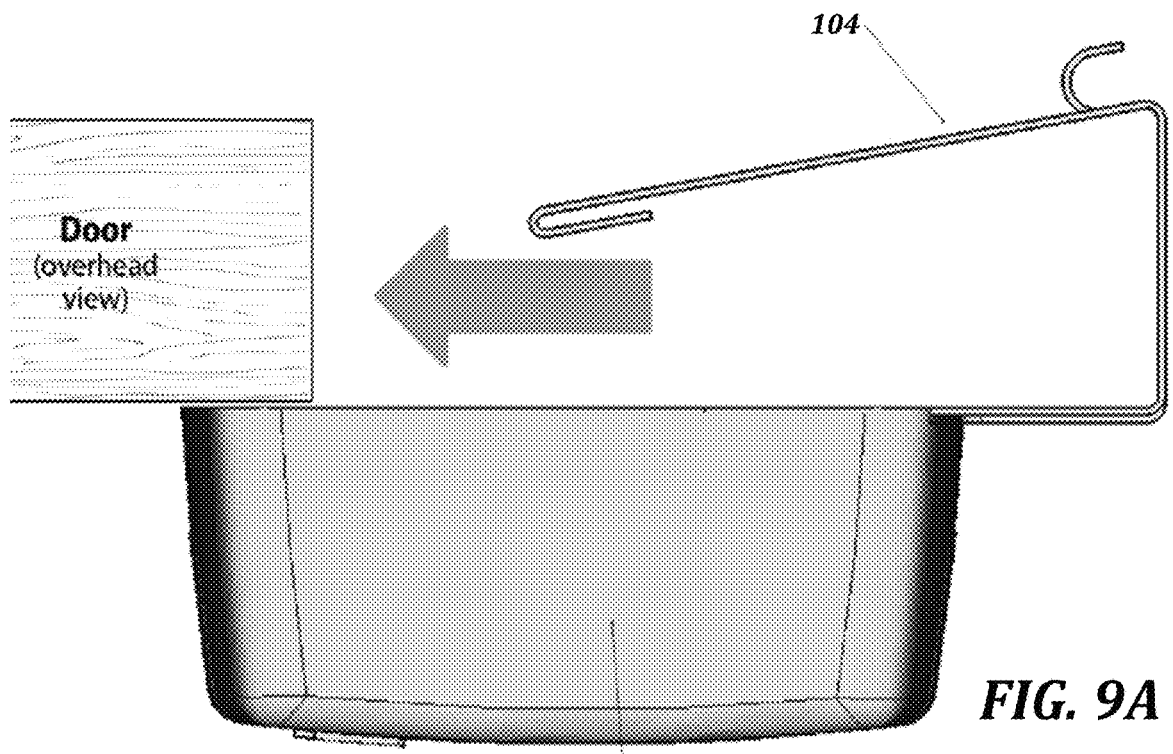
FIGS. 9A-9B show depictions of a device for securely mounting a video doorbell in accordance with an embodiment of the present disclosure.
Figure 9B:
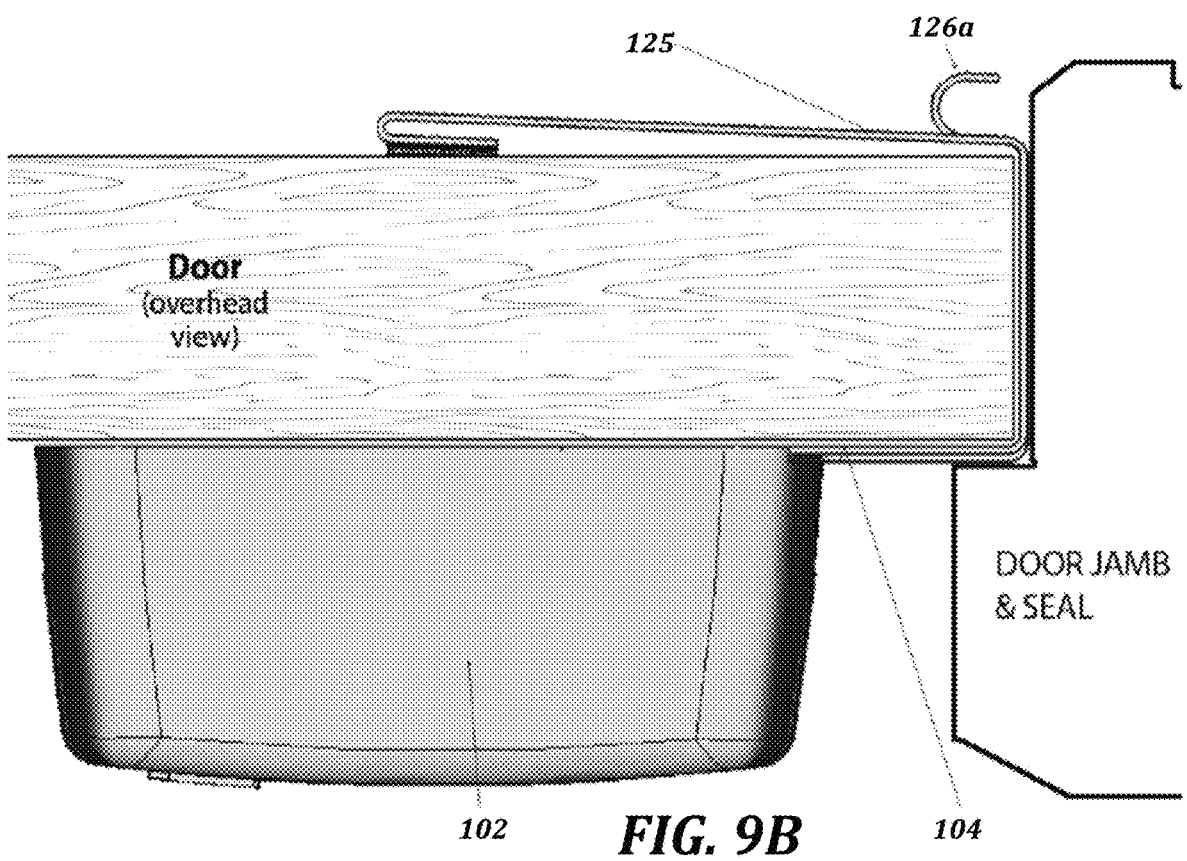
Figure 10G:
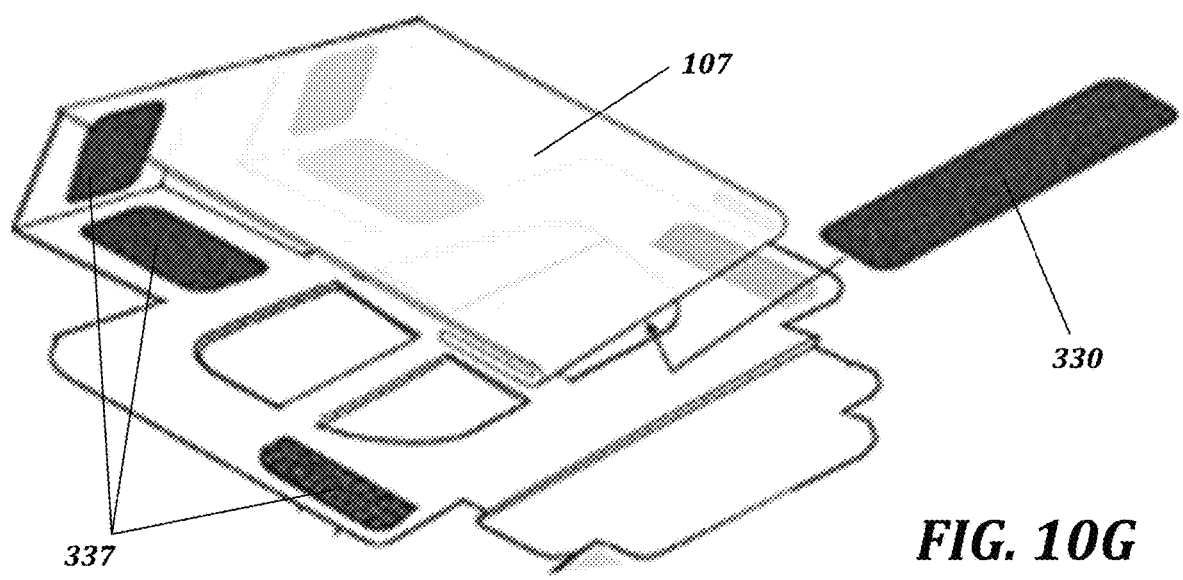
Figure 10H:
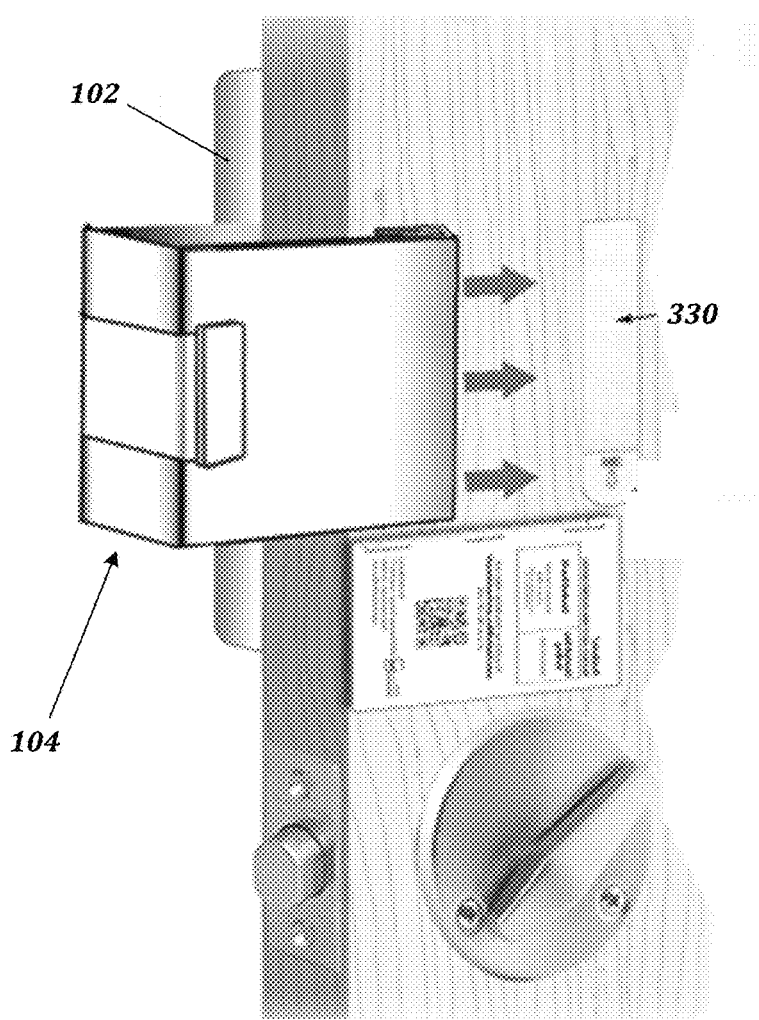

From stage 1020, where the first and second bracket member portions have been coupled, method 1000 may proceed to stage 1030, where the user may then mount the assembled device to an object, such as a door. As shown in FIGS. 9A-9B, the back plate may be made of a flexible material and angled less than parallel with the housing and/or less than perpendicular with the adjacent portion of the bracket members, and thus can apply pressure to the door to hold the device in place once slid onto the door. In some embodiments, an additional stabilizing or securing component, such as hook and loop fastener 330, can be used between the door surface and corresponding portion of bracket surface to ensure the device stays in mount position on the door. As shown in FIGS. 9B and 10G, fastener 330 is secured to the back plate folded lip of second bracket portion. As shown in FIGS. 9B and 10H, when the device is installed on a door, the device cannot be opened or removed when the door is closed. To this end, the anti-theft hook prevents tampering or potential theft from outside the door.

From stage 1030, where the device is used to securely mount the video doorbell, method 1000 may proceed to stage 1040, where the user can unmount the device from the door for charging or mount the device at different location. After stage 1040, method 1000 may end at stage 1050. In further aspects, a user may follow method 1000 to mount and remount the device at various locations as desired. While method 1000 describes a method for mounting a video doorbell, an advantage of the invention can be that it allows a user to use the device as both a standard video doorbell mount or portable video doorbell mount.

Also disclosed herein are kits comprising the disclosed devices. For example, in an exemplary aspect, the present disclosure provides a video doorbell kit comprising: a disclosed device; and instructions for using the device in connection with a method of mounting a video doorbell. In further aspects, the instruction and/or method may comprise any method and/or method step disclosed herein. In still further aspects, the method and/or method step may comprise affixing a disclosed device to an object, such as a door.

The present invention includes at least the following aspects: Aspect 1: A device for securely mounting a video doorbell, the device comprising: a housing for securely containing the video doorbell; and a bracket assembly configured to removably mount to a dimensional object, the bracket assembly comprising: a first bracket portion configured to releasably attach to the housing, the first bracket portion including a mounting plate and at least one bracket member extending from a first edge of said mounting plate at a first end of said bracket member, the bracket member including a bracket ledge extending or formed from an opposed second end of said bracket member; and a second bracket portion configured to detachably couple with the first bracket portion, the second bracket portion including a mounting plate, a back plate, at least one bracket member extending from a first edge of said mounting bracket to a first edge of said back plate, and at least one tongue extending from a second edge of said mounting plate.

Aspect 2: A device for securely mounting a video doorbell, the device comprising: a housing for securely containing the video doorbell; and a bracket assembly configured to removably mount to a dimensional object, the bracket assembly comprising: a first bracket portion configured to releasably attach to the housing, the first bracket portion including a mounting plate, a bracket ledge and at least one bracket member extending from a first edge of said mounting plate to a first end of said bracket ledge, the bracket ledge including a hooked portion extending or formed from an opposed second end of said bracket ledge; and a second bracket portion configured to detachably couple with the first bracket portion, the second bracket portion including a mounting plate, a back plate, first and second bracket members both extending from a first edge of said mounting plate to a first edge of said back plate, the first and second bracket members defining an opening therebetween, and at least one tongue extending from an opposed second edge of said mounting plate.

Aspect 3: The device of any preceding aspect, wherein the bracket assembly is a multi-piece bracket. Aspect 4: The device of any preceding aspect, wherein the bracket assembly is a two-part bracket. Aspect 5: The device of any preceding aspect, wherein the first bracket portion is configured to releasably attach to the housing. Aspect 6: The device of any preceding aspect, wherein the first bracket portion includes a mounting plate and at least one bracket member extending from a first edge of said mounting plate at a first end of said bracket member. Aspect 7: The device of any preceding aspect, wherein the bracket member includes a bracket ledge extending or formed from an opposed second end of said bracket member. Aspect 8: The device of any preceding aspect, wherein the mounting plate comprises an aperture or opening disposed within the outer edges. Aspect 9: The device of any preceding aspect, wherein the bracket ledge includes a hooked portion extending or formed from an opposed second end of said bracket ledge. Aspect 10: The device of any preceding aspect, wherein the hooked portion is an anti-theft hook configured to prevent theft when installed on a door. Aspect 11: The device of any preceding aspect, wherein the second bracket portion is configured to detachably couple with the first bracket portion. Aspect 12: The device of any preceding aspect, wherein the second bracket portion includes a mounting plate, a back plate, at least one tongue extending from an edge of said mounting plate, and at least one bracket member extending from an edge of said mounting plate. Aspect 13: The device of any preceding aspect, wherein one bracket member extends from a first edge of said mounting plate to a first edge of said back plate. Aspect 14: The device of any preceding aspect, wherein at least one tongue extends from a second edge of said mounting plate. Aspect 15: The device of any preceding aspect, wherein the mounting plate comprises an aperture or opening disposed within the outer edges. Aspect 16: The device of any preceding aspect, wherein the mounting plate comprises a plurality of apertures or openings disposed within the outer edges. Aspect 17: The device of any preceding aspect, wherein the second bracket portion comprises a plurality of bracket members extending between the mounting plate and back plate. Aspect 18: The device of any preceding aspect, wherein the second bracket portion comprises first and second bracket members extending between the mounting plate and back plate. Aspect 19: The device of any preceding aspect, wherein an opening is formed between the first and second bracket members of the second bracket portion. Aspect 20: The device of any preceding aspect, wherein the mounting plate of the first bracket portion comprises at least one opening disposed within outermost edges of said mounting plate. Aspect 21: The device of any preceding aspect, wherein the mounting plate of the second bracket portion comprises at least one opening disposed within outermost edges of said mounting plate. Aspect 22: The device of any preceding aspect, wherein the tongue of the second bracket portion is configured to couple with the mounting plate opening of the first bracket portion. Aspect 23: The device of any preceding aspect, wherein the tongue of the second bracket portion is configured to frictionally engage the mounting plate of the first bracket portion by extending through or within the opening of said mounting plate and securely engaging against a rear surface of said mounting plate. Aspect 24: The device of any preceding aspect, wherein the bracket member comprises an L-shaped member. Aspect 25: The device of any preceding aspect, wherein the bracket member comprises a U-shaped member. Aspect 26: The device of any preceding aspect, wherein the housing comprises top and bottom opposed sides, first and second opposed lateral sides, and front and rear opposed faces. Aspect 27: The device of any preceding aspect, wherein the each of the top, bottom, and lateral sides defining an outer edge of the front and rear faces. Aspect 28: The device of any preceding aspect, wherein the housing comprising an aperture disposed within outer edges of the front face, the aperture sized and dimensioned to smaller than the outer dimensions of the video doorbell contained within the housing. Aspect 29: The device of any preceding aspect, wherein the housing is a three-dimensional polygon. Aspect 30: The device of any preceding aspect, wherein the housing is an open container. Aspect 31: The device of any preceding aspect, wherein housing walls define an interior space for containing the video doorbell and/or one more operating elements of the device. Aspect 32: The device of any preceding aspect, wherein the rear face of the housing is open, and wherein the top, bottom, and lateral sides define the rear face opening. Aspect 33: The device of any preceding aspect, wherein the dimensional object is a three-dimensional object having a predefined thickness. Aspect 34: The device of any preceding aspect, wherein the dimensional object is a door or similarly dimensioned object. Aspect 35: The device of any preceding aspect, wherein the housing is configured to be mounted on an outer surface of an inwardly opening door. Aspect 36: The device of any preceding aspect, wherein the bracket assembly is configured to be mounted using an outer surface, side surface, and inner surface of an inwardly opening door. Aspect 37: The device of any preceding aspect, wherein when the device is installed on a door, the device cannot be opened or removed when the door is closed.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A device for securely mounting a video doorbell, the device comprising:
    a) a housing for securely containing the video doorbell; and
    b) a bracket assembly configured to removably mount to a dimensional object, the bracket assembly comprising:
    a first bracket portion comprising at least one bracket member configured to extend out from a first edge of said housing at a first end of said bracket member, said bracket member including a hooked portion at an opposed second end of said bracket member; and
    a second bracket portion configured to detachably couple with the first bracket portion, the second bracket portion including a mounting plate, a back plate, at least one bracket member extending from a first edge of said mounting plate to a first edge of said back plate.

2. The device of claim 1, wherein the bracket assembly is a two-part bracket.

3. The device of claim 1, wherein the bracket assembly is configured to be releasably attached to the housing.

4. The device of claim 1, wherein the bracket assembly further comprises a spacer screw for tightening against a door.

5. The device of claim 1, wherein the hooked portion of the first bracket portion is configured to detachably couple with the back plate of the second bracket portion.

6. A device for securely mounting a video doorbell, the device comprising:
   a) a housing for securely containing the video doorbell; and
   b) a bracket assembly configured to removably mount to a dimensional object, the bracket assembly comprising:
      a first bracket portion including a mounting plate, a bracket ledge and at least one bracket member extending from a first edge of said mounting plate to a first end of said bracket ledge, the bracket ledge including a hooked portion extending or formed from an opposed second end of said bracket ledge; and
      a second bracket portion configured to detachably couple with the first bracket portion, the second bracket portion including a mounting plate, a back plate, at least one bracket member extending from a first edge of said mounting plate to a first edge of said back plate, and at least one tongue extending from an opposed second edge of said mounting plate.

7. The device of claim 6, wherein the bracket assembly is a multi-piece bracket.

8. The device of claim 6, wherein the bracket assembly is a two-part bracket.

9. The device of claim 6, wherein the first bracket portion is configured to removably attach to the housing.

10. The device of claim 6, wherein the first bracket portion and the second bracket portion are configured to removably attach to the housing.

11. The device of claim 6, wherein the second bracket portion comprises first and second bracket members both extending from the first edge of said mounting plate to the first edge of said back plate, the first and second bracket members defining an opening therebetween said bracket members.

12. The device of claim 11, wherein the at least one bracket member of the first bracket portion is configured to extend through the opening of the second bracket portion for coupling together.

13. The device of claim 11, wherein the bracket ledge of the first bracket portion is configured to extend through the opening of the second bracket portion for coupling together.

14. The device of claim 6, wherein the back plate of the second bracket portion forms an acute angle where connected to the bracket members.

15. The device of claim 6, wherein the housing is comprised of a rigid material.

16. The device of claim 6, wherein housing walls define an interior space for containing the video doorbell.

17. The device of claim 6, wherein the device is configured to be mounted on an outer surface of an inwardly opening door.

18. The device of claim 6, wherein the bracket assembly comprises a flexible metal material.

19. A device for securely mounting a video doorbell, the device comprising:
   a housing for securely containing the video doorbell; and
   at least one bracket configured to removably mount to a dimensional object and releasably attach to the housing, the at least one bracket comprising
      a mounting plate and at least one bracket member extending from an edge of the mounting plate,
      the at least one bracket member comprising a bracket ledge at an opposed second end of said bracket member, said bracket ledge including a hooked portion extending or formed from an end of said bracket ledge.

20. The device of claim 19, wherein the at least one bracket member is a U-shaped bracket member or L-shaped member.

* * * * *